(12) United States Patent
Walsh

(10) Patent No.: US 12,331,442 B2
(45) Date of Patent: Jun. 17, 2025

(54) METHODS FOR STITCHING LATEX AND SIMILAR COMPOUNDS

(71) Applicant: Jessica M. Walsh, Glendale, CA (US)

(72) Inventor: Jessica M. Walsh, Glendale, CA (US)

( * ) Notice: Subject to any disclaimer, the term of this patent is extended or adjusted under 35 U.S.C. 154(b) by 0 days.

(21) Appl. No.: 17/836,497

(22) Filed: Jun. 9, 2022

(65) Prior Publication Data

US 2023/0399781 A1     Dec. 14, 2023

(51) Int. Cl.
*D05B 39/00* (2006.01)
*A41D 31/18* (2019.01)
*C08L 7/02* (2006.01)

(52) U.S. Cl.
CPC .............. *D05B 39/00* (2013.01); *A41D 31/18* (2019.02); *C08L 7/02* (2013.01); *A41D 2500/10* (2013.01); *A41D 2500/52* (2013.01); *D10B 2501/00* (2013.01)

(58) Field of Classification Search
CPC ....... D05B 39/00; D05D 2209/08; B32B 7/09
USPC ......................................................... 112/402
See application file for complete search history.

(56) References Cited

U.S. PATENT DOCUMENTS

| | | | |
|---|---|---|---|
| 2,053,839 A | 9/1936 | McClintock | |
| 2,418,347 A * | 4/1947 | Haag | D04D 7/00 28/164 |
| 2,434,527 A | 1/1948 | Untiedt | |
| 2,874,883 A | 2/1959 | Stoddard | |
| 3,043,311 A | 7/1962 | Barth | |
| 3,234,061 A | 2/1966 | Gardner | |
| 3,246,621 A * | 4/1966 | Copeland | A41D 27/24 428/102 |
| 3,452,812 A | 7/1969 | Crowther | |
| 4,064,631 A * | 12/1977 | Gebert | D05B 81/00 428/102 |
| 4,646,666 A * | 3/1987 | Burrier | B44C 3/12 112/475.08 |
| 4,837,864 A * | 6/1989 | Thill | A41D 27/08 2/244 |
| 5,636,385 A * | 6/1997 | Harrison | A41D 27/08 2/244 |

(Continued)

FOREIGN PATENT DOCUMENTS

| | | |
|---|---|---|
| CN | 210248515 U | 4/2020 |
| CN | 214231841 U | 9/2021 |

(Continued)

OTHER PUBLICATIONS

Professor Pincushion, Working with Silk and Silk-like fabric, https://www.professorpincushion.com/professorpincushion/working-with-silk-and-silklike-fabrics/ (Year: 2012).*

(Continued)

*Primary Examiner* — Uyen T Nguyen
(74) *Attorney, Agent, or Firm* — Offit Kurman; Douglas L. Lineberry

(57) ABSTRACT

Described herein are methods and techniques for sewing natural rubber latex and similar materials, and forming garments and articles from same, via novel stitching methods that interpose natural rubber latex between two translucent substrates that entirely cover the surface of the natural rubber latex and enable new ways to manipulate natural rubber latex and similar materials without the use of adhesive.

15 Claims, 28 Drawing Sheets

(56) References Cited

U.S. PATENT DOCUMENTS

| | | | | |
|---|---|---|---|---|
| 5,659,898 | A * | 8/1997 | Bell, Jr. | A63B 21/4025 2/69 |
| 5,885,679 | A * | 3/1999 | Yasue | D06H 5/00 428/57 |
| 6,051,090 | A * | 4/2000 | Healy | D05B 39/00 156/308.6 |
| 8,689,711 | B1 * | 4/2014 | Grover | D05B 11/00 112/475.08 |
| 8,955,447 | B1 * | 2/2015 | Miksch | D05B 19/12 112/475.19 |
| 10,583,621 | B1 * | 3/2020 | Schmidt | A41D 19/0006 |
| 2005/0087114 | A1 * | 4/2005 | Cho | D05C 17/00 112/475.22 |
| 2010/0064407 | A1 * | 3/2010 | Beshlian | A41D 13/1209 2/48 |
| 2011/0072591 | A1 * | 3/2011 | Fang | A47C 31/105 5/737 |
| 2013/0333093 | A1 | 12/2013 | Storelli et al. | |
| 2017/0164766 | A1 * | 6/2017 | Suchman | A47G 9/0246 |
| 2017/0238636 | A1 * | 8/2017 | Einesson | A41D 13/08 |
| 2017/0248391 | A1 * | 8/2017 | Andresen | A41D 31/245 |
| 2018/0140026 | A1 * | 5/2018 | Nijmeh | A41D 15/04 |
| 2018/0368500 | A1 * | 12/2018 | Pollock | A41D 1/14 |

FOREIGN PATENT DOCUMENTS

| | | |
|---|---|---|
| CN | 214964021 U | 12/2021 |
| GB | 775162 A | 5/1957 |
| GB | 1185622 A | 3/1970 |

OTHER PUBLICATIONS

PaperTR, What is Tissue Paper, https://www.papertr.com/what-is-tissue-paper/ (Year: 2021).*

TEG—The Evans Group, 11 Industry Sewing Tips for Delicate Fabrics, https://tegintl.com/sewing-tips-for-delicate-fabrics/, Mar. 8, 2022.

Live Journal, To Sew or Not to Sew?, https://latexcrafters.livejournal.com/31997.html?noscroll&utm_medium=endless_scroll#comments, Aug. 5, 2005.

Vivishine, Glued, Dipped or Sewn?, https://www.vivishine.com/reading-blog/glued-dipped-or-sewn, Mar. 7, 2022.

* cited by examiner

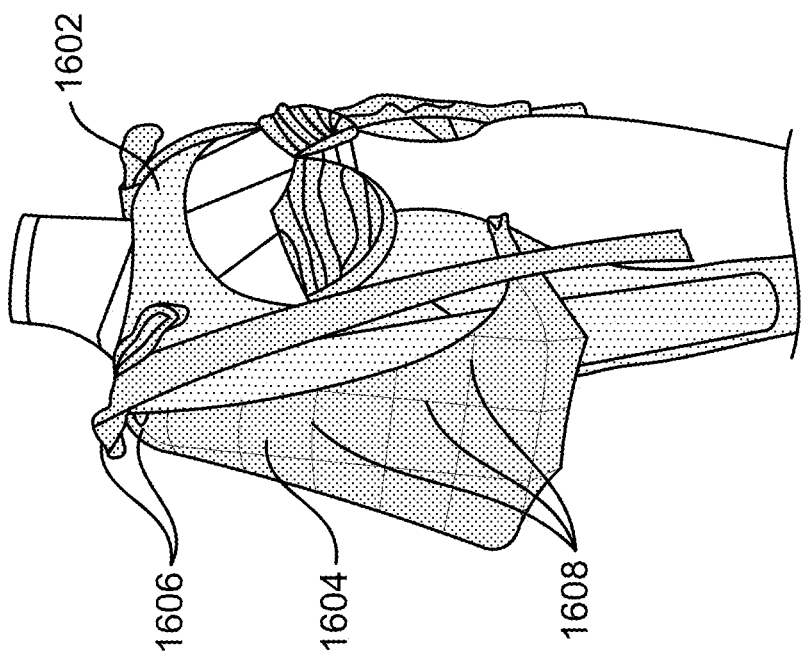
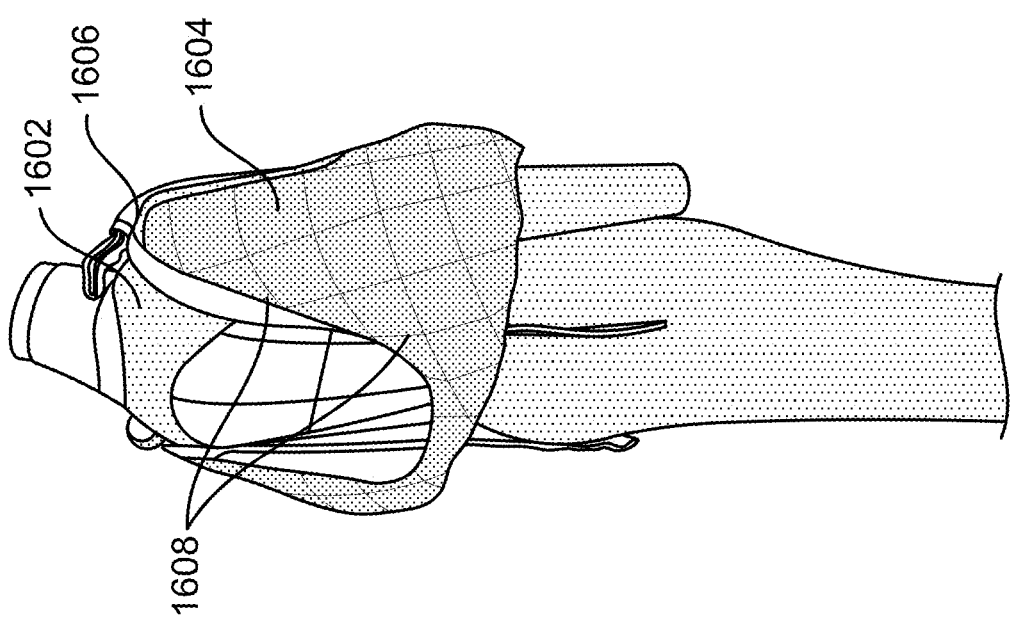
FIG. 16B
FIG. 16A

METHODS FOR STITCHING LATEX AND SIMILAR COMPOUNDS

TECHNICAL FIELD

The subject matter disclosed herein is generally directed to methods and techniques for sewing natural rubber latex and similar materials, and forming garments and articles from same, via novel stitching methods that enable new ways to manipulate latex and similar materials in ways heretofore considered impossible in clothing and related industries.

BACKGROUND

Latex fabric has become very well received in the fashion community. Indeed, some sources claim that latex might truly be "the whole package." laidtex.com/blogs/news/latex-in-the-world-of-fashion. Latex is a very versatile clothing foundation and can range from a small accessory like a vest or belt or an entire head to toe ensemble. Latex is "more than just a fashion statement—it is a comfortable, aesthetically appealing, confidence boosting style choice." Id.

Latex fabric, or "latex sheeting" as it is often referred to in the fashion industry, is known as a material that cannot be sewn, but most be glued. Indeed, the clothing/fashion industry's viewpoint is that "[y]ou cannot sew latex fabric. With latex, you cannot join fabrics together by stitching, so you have to set aside the idea of normal sewing. You can hold latex fabrics together to create garments using glue because the [sewing needle/stitches] will only damage the material." crafttribeonline.com/can-you-sew-latex fabric/#:~:text=How%20do%20you%20seam%20latex%3F%201%20The%20seam.it%2C%20do%20not%20panic.%20 . . . %20More%20items . . . %20. This adage is repeated throughout the fashion industry and sewing circles. "The [latex] seams are held together, not with stitching, but with glue, specifically, [c]ontact cement." www.braandcorsetsupplies.com/2017/04/09/how-to-work-with-latex/ Even manuals on latex fashion completely omit any mention of sewing latex. See, *Working with Latex* by Catasta Charisma. Latex forums also completely omit sewing as a possibly way of joining latex to itself or other fabrics. See, makinglatexclothing.com/getting-started; latexrepair.nl/Latex-Newbie; latexpermeter.com/en/service-product-info; www.latexwiki.com; www.mookyclick.co.uk/indie-fashion/alternative-style, etc.

Accordingly, it is an object of the present disclosure to provide novel techniques and methods for sewing and stitching latex and similar materials to provide strong seams, fabric manipulations utilizing techniques such as quilting and gathering, that can be used to create new clothing, decorative and utilitarian machine stitching techniques, and useful articles previously considered impossible without the use of adhesives or glue. Decorative sewing/stitch manipulations as well as utilitarian sewing techniques can now be used with latex; these sewing techniques have not appeared before in fashion and have not been utilized in combination with latex fabric before this novel techniques of the current disclosure were developed.

Citation or identification of any document in this application is not an admission that such a document is available as prior art to the present disclosure.

SUMMARY

The above objectives are accomplished according to the present disclosure by providing in one instance a method for sewing latex fabric. The method may include placing a first piece of latex between a first substrate and a second substrate to form a multi-layer protective support construct with the first piece of latex between the first substrate and the second substrate, stitching through the first substrate, the second substrate, and the first piece of latex to form at least one stich in the latex, removing the first substrate and second substrate to reveal the at least one stitch; and wherein no adhesive is used. Further, the method may include at least one piece of fabric placed adjacent the first piece of latex and between the first and second substrate and then the at least one piece of fabric and the first piece of latex stitched together between the first and second substrate to form at least one stitch between the at least one piece of fabric and the first piece of latex. Further, a second piece of latex may be placed adjacent the first piece of latex, both between the first substrate and the second substrate, and the first piece of latex and second piece of latex are stitched together between the first substrate and the second substrate to form at least one stitch between the at least one piece of first piece of latex and the second piece of latex. Still further, at least three pieces of latex may be placed adjacent one another, all between the first substrate and the second substrate, and the at least three pieces of latex are stitched together between the first substrate and the second substrate. Further again, at least two pieces of fabric and at least two pieces of latex may be placed adjacent one another, all between the first substrate and the second substrate, and the at least two pieces of fabric and at least two pieces of latex are stitched together between the first substrate and the second substrate. Moreover, the first substrate and the second substrate comprise low GSM paper. Further again, thread is used to form the stitch in the first substrate, second substrate and first piece of latex. Still again further, patchwork, piping, pleating, shirring, stitch-and-slash, gathering, smocking, quilting, machine embroidery, hand embroidery, top-stitching, pleating and/or applique may be formed in the first piece of latex. Further again, patchwork, piping, pleating, shirring, stitch-and-slash, gathering, smocking, quilting, machine embroidery, hand embroidery, top-stitching, pleating and/or applique may be formed in the at least one piece of fabric and the first piece of latex.

In a further instance, a garment comprising stitched latex is formed. The garment formation may include forming a clothing pattern, comprising at least one first pattern block, from latex, placing the first pattern block of latex between a first substrate and a second substrate to form a multi-layer protective support construct with the first pattern block of latex between the first substrate and the second substrate; stitching through the first substrate, the second substrate, and the first pattern block of latex to form at least one stich in the latex; removing the first substrate and second substrate to reveal the at least one stitch; and no adhesive is used. Further, the first pattern block of latex may be placed adjacent a second pattern block of latex, with the first pattern block of latex and the second pattern block of latex both between the first substrate and the second substrate; and stitching the first pattern block of latex to the second pattern block of latex between the first substrate and the second substrate to produce at least on stitch joining the first pattern block of latex to the second pattern block of latex. Still yet, the first pattern block of latex may be placed adjacent a first pattern block of fabric, with the first pattern block of latex and the first pattern block of fabric between the first substrate and the second substrate; and stitching the first pattern block of latex to the first pattern block of fabric between the first substrate and the second substrate to produce at least one stitch joining the first pattern block of latex to the first pattern block of fabric. Further again, at least two pattern blocks of latex may be placed adjacent at least two pattern blocks comprising fabric, with the at least two pattern blocks of latex and the at least two pattern blocks comprising fabric between the first and second substrate; and stitching the at least two pattern blocks of latex and the at least two pattern blocks comprising fabric between the first substrate and the second substrate. Still yet further, the first substrate and the second substrate comprise low GSM paper. Again still further, thread may be used to form the stitch in the first substrate, second substrate and first piece of latex. Moreover, the garment may include patchwork, piping, pleating, shirring, stitch-and-slash, gathering, smocking, quilting, machine embroidery, hand embroidery, top-stitching, pleating and/or applique in the first pattern block of latex. Still further yet, the garment may include patchwork, piping, pleating, shirring, stitch-and-slash, gathering, smocking, quilting, machine embroidery, hand embroidery, top-stitching, pleating and/or applique in the first pattern block of latex or the first pattern block of fabric.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 16 shows a photograph of a garment formed via the current disclosure at: (A) a back view of a garment having quilted latex sewn into the collar via the methods disclosed herein; and (B) a side view perspective of the garment.

Figure 1:
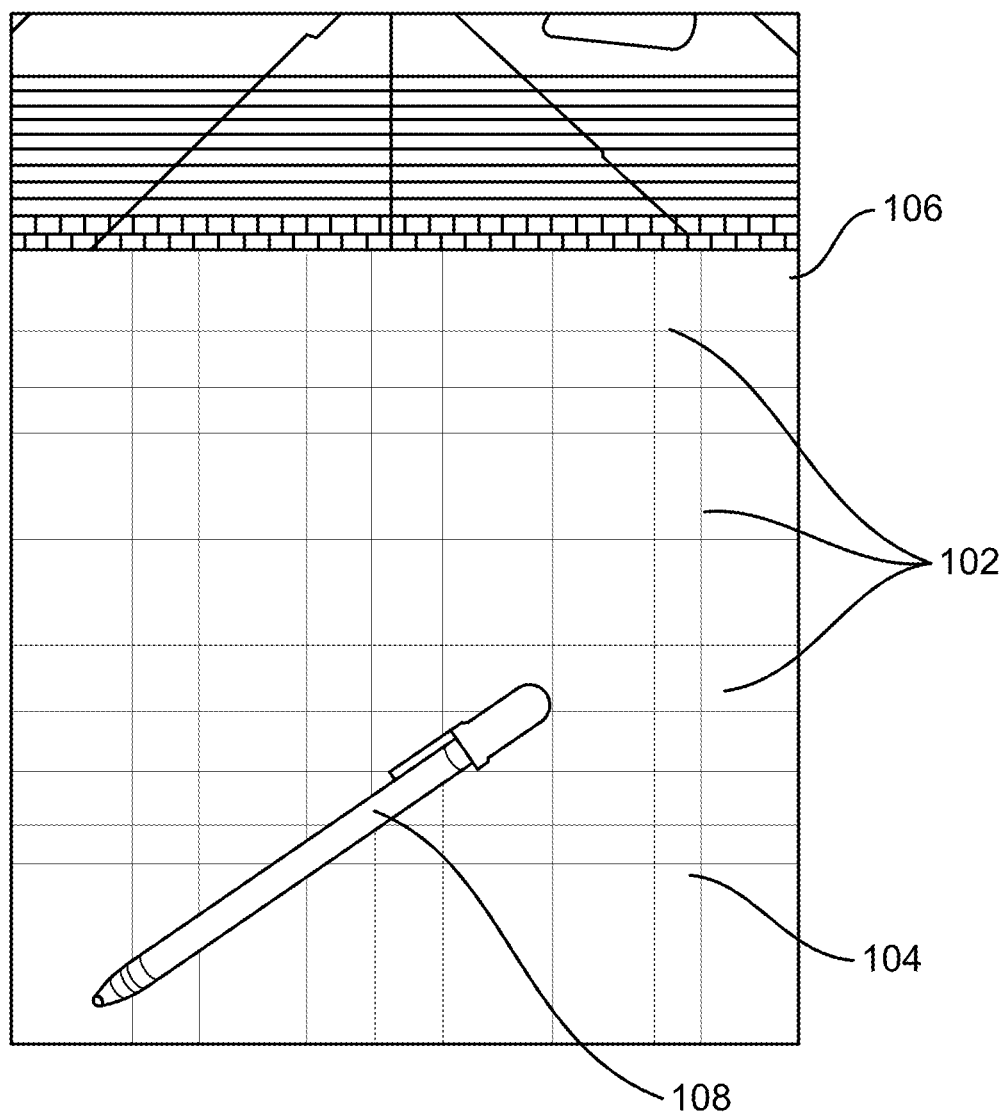
FIG. 1 shows a photograph of grid lines that may be used with the methods of the current disclosure.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Kits

Any of the techniques, methods, or garments described herein can be presented as a combination kit. As used herein, the terms "combination kit" or "kit of parts" refers to the materials, latex or similar materials, fabrics, thread, paper and any additional components that are used to package, sell, market, deliver, and/or provide the combination of elements or a single element, such as a latex garment pattern, contained therein. Such additional components include, but are not limited to, packaging, thread, sewing supplies, GSM paper, latex or similar materials, and the like. When one or more of the materials, latex or similar materials, fabrics, thread, paper and any additional components, described herein or a combination thereof (e.g., a garment pattern including preformed clothing sections) in the kit are provided simultaneously, the combination kit can contain the materials, latex or similar materials, fabrics, thread, paper and any additional components in a single combination, such as a sewing or garment pattern kit or in separate combinations such as a pattern sold alone, latex or similar material patterns, sewing supplies combined with materials, etc. When materials, latex or similar materials, fabrics, thread, paper and any additional components described herein or a combination thereof and/or kit components are not provided simultaneously, the combination kit can contain each component in separate combinations. The separate kit components can be contained in a single package or in separate packages within the kit.

In some embodiments, the combination kit also includes instructions printed on or otherwise contained in a tangible medium of expression. The instructions can provide information regarding how to sew latex or similar materials, how to arrange the necessary papers and latex/fabrics on a sewing machine, guides for sewing, safety information regarding the contents, etc. In some embodiments, the instructions can provide directions and protocols for employing the methods and techniques described in greater detail elsewhere herein.

The current disclosure provides methods and techniques for sewing latex and similar materials, and forming garments and clothing from same, via novel stitching methods that enable new ways to manipulate latex and similar materials in way heretofore considered impossible in clothing and related industries. Still further, multiple pieces of latex may be placed adjacent one another, all between a first substrate and second substrate, and the multiple pieces of latex are stitched together between the first substrate and the second substrate. Further again, at least two pieces of fabric and at least two pieces of latex may be placed adjacent one another, all between the first substrate and the second substrate, and the at least two pieces of fabric and at least two pieces of latex are stitched together between the first substrate and the second substrate. Moreover, the first substrate and the second substrate comprise low GSM paper or a combination of GSM and a fabric layer. Still again further, top-stitching, decorative stitching, patchwork, piping, stitch-and-slash, gathering, smocking, quilting, pleating, shirring, machine embroidery, hand embroidery, applique, and/or any sewing techniques/manipulations may be formed in the at least one piece of fabric and the first piece of latex.

In addition to the newly discovered technique disclosed herein, the current methods also provide various health benefits. Instead of using dangerous glue adhesives to bond two pieces of latex, such as natural rubber latex, sewing this material will generate a significantly safer alternative to creators, industry workers, and hobbyists working with latex at large. The adhesives used for bonding latex have significantly detrimental and well-documented negative effects to the human body. Measures have to be implemented to keep workers safe, including recommending protective gear, such as gloves, protective glasses, masks, etc. because of health concerns. There are also exposure limits in place for workers in place because of the present dangers in adhesives. Further, solvent-based adhesives have shipment/import regulations due to the flammability. When using solvent adhesives and water-based, one must work in a well ventilated space, and failing to do so can cause lasting harm. Various adhesives include the following potentially hazardous compounds: cyanoacrylate, heptane, hexane, rubber cement, vinyl acetate, ammonia, ethylene vinyl acetate, acrylic resin emulsion polymers.

Further, one employing the techniques and methods described herein may use 100% medical grade latex. Many latex products, especially in the fashion industry, have fillers and are not completely biodegradable. These products can have a high possibility of inducing an allergic reaction to the user because they are not properly leached to the medical standard. Natural Rubber Latex has several qualities which make it coveted in the medical community. The material is durable and protects practitioners from biological hazards, such as viruses and bacteria, and bodily fluids.

While having various applicability in the medical and manufacturing sectors thanks to discovering heretofore considered impossible ways to sew and stitch latex, the current disclosure also provides the ability to add various decorative elements to latex and similar materials. This opens up many opportunities for the material in the fashion industry and elsewhere because of its decorative and aesthetically pleasing nature. For instance, top stitching, designed to be seen on garments and apparel, was previously limited to fabrics. Thanks to the present disclosure, top stitching, as well as other stitching and sewing techniques such as straight stitch, zig-zag stitch, overcast stitch (overlock stitch), blind hem stitch, decorative stitches, and buttonhole stitches to name a few. Some of the stitches mentioned above are vital to the garment making process. For example, zig-zag stitches can be a seam finish for a garment and is used on the raw edges of fabric. One can turn up the unfinished hem and zig-zag stitch on a home sewing machine to finish the raw edge or simply sew directly onto the raw edge to finish it. While it varies on the GSM of the fabric used, a zig-zag stitch length of 3.0 mm and width of 4.0 mm sewn directly onto the edge of the fabric is recommended. This technique blocks fraying and ripping of the fabric and ensures longevity of the edges on the garment being constructed. One can also gather fabric with the zig-zag stitch by sewing a zig-zag stitch over cording or a string. Occasionally, a zig-zag stitch is the best option for a hem because it produces flatter edges that tend not to curl with special fabrics such as latex. Zig-zag stitches can also be used for buttonholes, sometimes this approach is easier than programmed buttonhole settings in some machines. Applique is a method of stitch work accomplished with a very close zig-zag stitch commonly measuring around 0.5 length to 4.0 width. Certain seams can be achieved with the zig-zag stitch. "Butt seams" are joined with a zig-zag stitch or even chain stitch and help eliminate bulk this seam is commonly seen used in lingerie. Applique is a sewing method so that very little fabric is revealed between stitches. Applique allows decorative motifs to be sewn onto fabric. The most common and versatile stitching method is the straight stitch. As a general rule a stitch length of around 2.0-3.0 mm is used for the majority of straight stitch sewing. Gathering can be accomplished with the straight stitch when using a longer stitch length of around 4.0 mm. Gathering fabric creates ruffles. These long stitches can be easily removed if necessary, and when not pulled and gathered, can be used to "baste" the fabrics together. Basting temporarily holds two pieces of fabric together before the final, smaller stitches are in place. A straight stich can also finish raw edges when folding the raw edge upwards once or twice. Sewing plain seams can create sewing darts, tucks, edge stitching, and other elements such as topstitching. Nearly everything can be accomplished with a straight stitch machine. Sewing plain seams are the first step to making more intricate ones such as a plain seam with double topstitch (for durability), hairline seams (commonly used on enclosed areas and collars), lapped seam/tucked seam (great for heavier weighted/GSM fabrics as it will eliminate excess bulk), French seam (best for sheer fabrics because the seams will enclose the raw fabric edges in a fold so that they are not seen on the right side of the fabric and help eliminate bulk), flat felled seam (seen often in sport's wear, jeans, pajamas, etc. Seam can be stitched on right and wrong side of the garment), mock flat fell seam (raw edge is not turned under, this is seen in flat fell seams. This seam has exposed raw edges on the wrong side/is a great option for fabrics that do not fray or where the seam is not seen), piped/corded seam (seen often in cuffs, collars, and pockets. This seam has cording inserted between the seam line and adds decoration commonly seen in the fashion industry), faced seam (usually used in necklines, waistlines, and armholes. It creates a good finish to the original seam line), hemmed fell seam (a plain seam with one side trimmed in half while the other seam is turned downward and hemmed by hand), mock French seam, serged seam (the serger stitch is used on seams and consecutively trimmed by the machine. This stitch aids to stretch and flexibility of the seam), taped seam (seam that is sealed with a tape for waterproofing/weatherproofing. This seam has a strip of fabric/tape sewn into the seam to avoid distortion of fabric and prevent any outside elements including water from seeping inside of the item being sewn. The over-edge or overlock stitches are used to stop edges from fraying. This stitch is similar to what a serger sewing machine produces, except the serger will cut the fabric as one sews overlock stitches. A serger creates cleaner stitches and is used in the professional garment sewing industry as a standard for finishing any raw edges, inside and outside of garments. Using a serger significantly saves time when sewing because it simultaneously evenly trims the fabric which would otherwise need to be trimmed by hand. There are special sewing machines called "blind stitch hem sewing machines" as well which specialize in creating the blind stitch which is often used for creating invisible hems on skirts, trousers, and dresses. The stich is similar to a zig-zag stitch but looks a bit more uneven because of its function. One can also sew a blind stich with a home sewing machine that has a blind stitch feature. Once these stitches are completed, they hardly can be seen on the right side of the garment. The right side of the garment refers to the outside areas that can be seen when worn. The wrong side of the fabric is what is on the inside of the garment. Depending on the home sewing machine, there are always options varying from a few decorative stitch options to a multitude of decorative line designs programmed in the machine. Decorative stitching is not commonly seen in the fashion industry, but depending on garment design themes they may be used. Decorative stitches are more commonly seen on smaller items such as baby clothing. The reverse straight stitch is just another commonly used sewing technique for stitching. The reverse straight stitch is essential when sewing seams or stitch lines of any kind. This technique anchors the thread into the fabric and secures the stitches in place. This technique is done by straight stitching around 3 stitches forward and then while keeping the needle in the fabric, using the reverse lever on the sewing machine to straight stitch backwards directly over the initial stitches. This should be repeated at the end of every finished seam/stitch line. Some more common stitches that can be achieved are the triple straight stitch, edge stitch, coverstitch, blind hem stitch, overcast stitch, shell tuck stitch, multi-step zig-zag stitch, and finally but not lastly, the ladder stitch. There are a plethora of stitching methods so covering the most commonly used ones has been done. Most specialty stitching is used for a distinct purpose as explored above in a few of the above sewing methods discussed. Top-stitching is an element commonly seen on jeans and leather goods, it is designed to be seen on the outside of garments, for functionality or simply decoration. Top-stitching adds a luxurious quality to leather goods- and latex has recently been utilized in fashion as a leather alternative in recent years. Environmentally consciously speaking, the material is a plausible and exciting alternative to animal skin leather as animals are not being exploited and latex is a vegan friendly product. Further, latex is a raw material and biodegradable and provides a viable solution to the search for a sustainable, biodegradable leather alternative.

Figure 13:
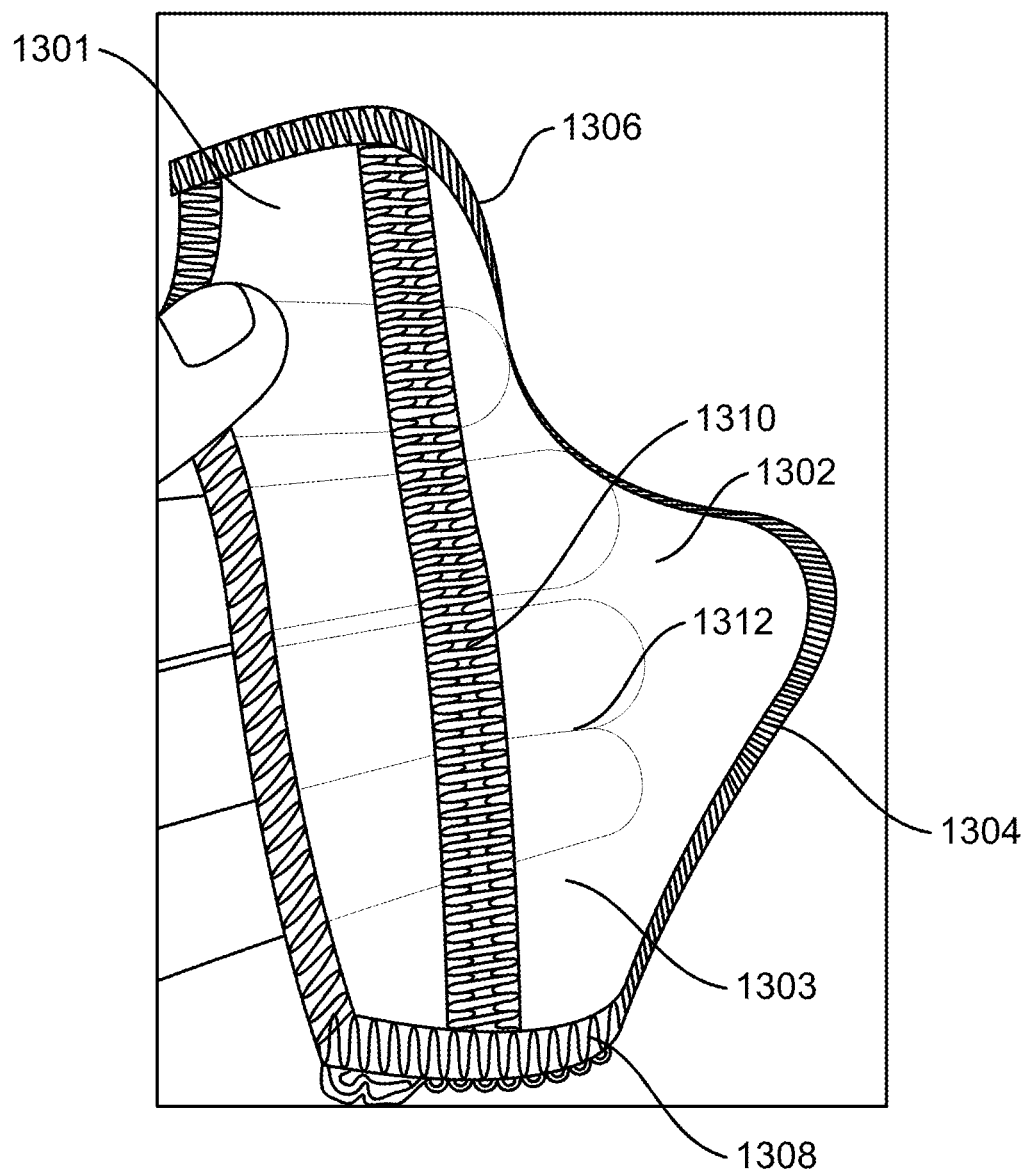
FIG. 13 shows a photograph of two pieces of latex overlocked/serged together.

The current disclosure will also allow latex to have industry finished edges and seams, see FIG. 13. Using a serger machine is another way of fusing/sewing the material together via machine stitching that has not been utilized in the fashion/textile industry or elsewhere with natural rubber latex or similar un-sewable materials that tend to jam inside the sewing machine. Serger Machines have had no known luck when sewing latex rubber due to its notorious nature to jam sewing machines. Being an un-porous material, similarly to the metal on sewing machines, the material interacts undesirably and stick to the feed dogs, side/throat plates, and presser foot. This causes the latex to bunch up and stick to those areas that can cause severe disruptions to the machine and jam the material and thread into the bobbin case under the feed dogs and plates. Unjamming sewing machines is an arduous endeavor and is to be avoided at all costs, especially with a serger machine due to its complicated nature and operating differently than a normal sewing machine because it has no bobbin to function. Sergers are complex machines compromising of 3/5 spools of thread, it is a meticulously designed machine which can be quite complicated and confusing to thread. This industry standard finishing process has not been able to be utilized in the fashion/textile manufacturing industry with latex rubber. Sergers are extremely fast and efficient sewing machines. They combine three functions into a simple one-operation task. This includes stitch, trimming excess seam allowance, and overcasting the edge of the fabric by forming loops with thread sewn. This 3 in one sewing/trimming machine enables the user to create professional stitching very quickly. Latex has notably only had hem finishes and seams done with glue adhesives applied by hand. The ability to use a serger sewing machine with rubber latex significantly cuts production time of products. Extremely similar to the serging machine, a coverstitch machine can also now be used with latex rubber with the same newly developed method as sewing it with a normal sewing machine. The coverstitch compromises of the same stitching methods as the serger but it has the ability to sew a straight stitch and folded hem simultaneously, whereas a normal serging machine cannot fold hems. Coverstitch machines also allow latex to be sewn with the chain stitch and of course the coverstitch. The serger specializes in seams and coverstitch machines are more for hemming. Coverstitch machines can be used decoratively with latex sewing. The chain stitch can be used on its own or to connect two rows of straight stitching on the wrong side of the fabric. This can also be used decoratively on the right side of the fabric. The coverstitch is a stitch that is compound, consisting of two parallel lines of straight stitching on the right side of the fabric/latex, connected by a chain stitch of the wrong side. The sealed hem is now strong, flexible, and professional. The invention of the serging machine changed the lives of people in the textile manufacturing industry by increasing stitch speed per minute significantly. Industrial sewing machines can reach speeds of around 1,000 to 5500 spm and the industrial serging machine an incredible maximum of 7000 spm while completing three tasks in one simple operation. With such high speeds of operation available to be completed with rubber latex now as opposed to sole hand operations aids in manufactures ability to create and finish projects quickly, faster than ever before. Sergers are unique in the way that they draw thread from 3-5 spools at all at once, creating strong and sturdy seams that are unlikely to tear due to the intricate looping process of all of the threads, resulting in a very durable structure. Serger home sewing machines also produce far more stiches per minute compared to the average home sewing machine. Home sergers average maximum around 1500-1700 stitches per minute, whereas regular home sewing machines stitch about 1000-1200 stitches per minute. Sergers have proven helpful to the process of sewing latex because the machines actually specialize in sewing stretchy fabrics. The looping of threads allows optimal stretching for fabrics. For example, the serging sewing method is used in the production of swimwear/lingerie products. The serged stitches are durable and strong, they create seams that hold up against rough handling or wear. The industry standard (how all clothing is expected to have its raw edges finished) is with the serger. The serger gives clothing a complete and professional appearance as opposed to glued seams and hem finishes. Small details that create an idea of luxury/quality and not costume are textile and fashion industry standards that because of the current disclosure are now available to rubber latex. This gives the biodegradable raw material a higher chance of success in the constantly changing and evolving fashion industry. These new breakthroughs in sewing and serging natural rubber latex aid the material's process of detaching from previous associations such as the hobbyist, fetish, and crafty aspect of the material. The biodegradable raw material that is a newly notable leather alternative has a higher chance of longevity and success in the fashion market because of the ability to now utilize techniques with sewing. The method developed to sew latex is an aiding factor in being more widely used as opposed non-biodegradable leather alternatives that contain plastics. Serging machines can complete overlock stitches, two-thread overlock (sealed seam to minimize bulk) three-thread overlock (one of the go-tos for garment construction) four-thread overlock (creates a sturdy seam; especially seen in blue jeans), two-thread overlock wrap stitch, three-thread stretch overlock stitch, flatlock stitches (creates flat seams). Flatlock stitches can create flatlock stitches with to, three, or four threads. One can create wide/narrow variations. Rolled hems can also be achieved in two and three-thread varieties, which is the basis of a decorative lettuce edge. The picot stitch, wave stitch, two blanket stitches are also seen in some models.

The stitches produced via the current disclosures sewing and stitching methods ensure the latex or similar material does not rip or snag. The "industry norm" of sewing and finishing garments can now be achieved with latex via the methods and techniques disclosed herein.

All classically sewn seams, such as but not limited to plain seam, double stitched seam finished, net-bound seam finish, edge stitched seam finish, pinked finish, overcasting stitched seam finish, zig zag stitched seam finish, stitched and pinked, bound seam, plane seam, eased seam, topstitched seam, lapped or tucked seam, French seam, Mock French seam, flat felled seam, welt seam, double welt seam, slot seams, piped seams, corded seams, etc. can be achieved though the methods and techniques of the current disclosure as the processes sew latex and create a structurally sound, functional garment, article, or construct, such as handbags, surgical drapes, tarps, umbrellas, gloves, wallets, hats, shoes, trousers, skirts, evening wear, belts, shorts, intimate wear, outerwear, ready to wear, blouses, dresses, mattresses, raincoats, diapers, handgrips for bicycles, scooters, etc., blood pressure cuffs, scuba equipment, carpet backing, bed protectors, medical injection ports/bags, any and all leather alternative items, camping gear, luggage, sports equipment, rock climbing gear, parachutes, industrial, drapery, car mats, upholstery, jeans, puffer jackets/vests, quilted garments, smocked and gathered garments, furniture.

The methods and techniques of the current disclosure allow latex and similar materials to take on beautifully and structurally sound sewn fabric manipulations. These manipulations may include but are not limited to quilting, gathering, smocking, piping, top stitching, decorative stitching, patchwork, pleating, shirring, stitch-and-slash, machine embroidery, hand embroidery, pleating, and/or applique. These techniques can also be used in combination with rubber latex combined with fabrics or other materials to provide industry standard fabric manipulations with decorative stitching, industry standard seam finishes to garments/articles made via the techniques and methods described herein. The fashion industry standard is 1.5 cm of seam allowance on pattern pieces. Stitching quality can be measured by many elements. "The stitch size can be measured by the following.

Stitch Size
- Stitch length—Distance from one stitch juncture to the next successive stitch juncture in the sewing line.
- Stitch width—Distance between the outermost stitch juncture or distance between the outermost edges of the lateral thread placement.
- Stitch depth—Distance between the upper and lower surfaces of the stitch.
- Stitch tension
- Stitch sequence
- Elongation
- Elasticity
- Resilience
- Fabric distortion
- Yarn severance
- Abrasive strength"
www.textileschool.com/311/quality-and-uses-of-stitch-types Below is an excerpt of standards laid out (texas4-h.tamu.edu/wp-content/uploads/Resources_Fashion_Show_clothing_quality_standards.pdf)

Fabric, trim and construction techniques must work together to create a professional-looking garment. The fabric should have the correct weight and drape for the design. Finishing details should complement the fabric and the garment.

HEMS: A well-made hem should:
- Be inconspicuous on the right side, except when it is a decorative part of the garment design.
- Be an appropriate distance from the floor.
- Be even in width and an appropriate depth for the fabric and garment design.
- Be free from bulk in seams that fall within the hem area.
- Have fullness eased in and evenly distributed for a smooth, flat appearance.
- Have an edge appropriately finished for the type and weight of fabric and hem stitch to be used.
- Be firmly secured with a hem stitch appropriate for the fabric and the hem edge finish.
- Be neat with evenly spaced hand stitches ½ inch apart and with about ⅛ inch give (or have even machine stitching).
- Be lightly pressed.

Machine Stitching: A well-made stitch will:
Use a thread type and needle size appropriate to the fabric and situation for which it is used. Generally, the finer the fabric, the finer the needle and thread. (Thread expands to or takes up the entire area created by the needle.) There should be no excessive holes created by the needle.

Be a controlled, consistent length appropriate to the fabric and situation for which it is used. As a general rule, the heavier the fabric, the longer the stitch; the lighter weight the fabric, the shorter the stitch. Within this rule adjustments are made according to fabric texture and structure.

Have equally balanced top and bottom threads that look the same on both sides of the fabric (appropriate thread tension).

Be the type of stitching (regular sewing machine or overcast/serger) or stitch pattern (standard or decorative) appropriate to the fabric and situation for which it is used.

Be appropriately secured at the beginning and end of the line of stitching.

Be spaced an appropriate distance from the edge of the fabric according to the function of the stitching.

Be neat, straight, and fit the purpose for which it was done (functional or decorative).

Seams, Seam Finishes, Seam Treatments
A well-constructed seam should:
- Be smooth and even in appearance on the inside and outside of garment.
- Machine tension, stitch length and presser foot pressure are properly adjusted to suit the fabric and thread.
- Be even in width throughout.
- Be secure.
- Be pressed open (and with no puckers) or pressed properly according to the type of seam it is and the way it is used in garment construction.
- Be stitched with thread appropriate to the fabric type, fabric content and color. (Thread color should match or be slightly darker than the fabric.)
- Have consistent stitch length.
- Be flat and trimmed and/or graded, if needed, to reduce bulk.
- Match fabric designs such as plaids and stripes.

A well-applied seam finish:
- Is appropriate to the type and weight of fabric.
- Is smooth and neat in appearance inside and out.
- Does not create excess bulk.
- Is not visible from the right side of the garment.
- Is even in width throughout.
- Uses understitching to "roll under" an enclosed seam and is not visible on the right side.
- Uses reinforcement stitches on areas of stress.

Darts, Ease, Gathers, Pleats, Shirring, Tucks
A well-constructed fitting dart should:
- Be directed toward the body curve.
- Usually end ½ to 1 inch from the fullest part of the body curve.
- Be tapered so it is smooth and free of puckers.
- Be even and smooth in appearance.
- Be pressed before being crossed by another line of stitching.
- Have threads secured at both ends by tying a knot, lock stitching or back-stitching (use only on medium to heavy fabric or in a seam line)
- Usually use a single thread for hand-worked hems and basting and a double thread to secure hook and eyes, snaps and buttons, and to tack seams.
- Be neat and well formed, appropriately spaced, and secured with no thread ends showing or unsightly thread "mess" visible.
- Be invisible on the right side when hemming or tacking seams.

"But one relatively subtle area that deserves special attention is the stitching. And most professionals working in the garment industry take great pains to ensure the right sewing techniques are used in mass production. They may be small, but stitches are an important consideration when importing or manufacturing garments. Different sewing stitches for clothing offer their own advantages and disadvantages. Some stitches are better suited for style and decoration, for example. Others are more durable and suited for different applications. And certain techniques consume more thread or take longer to weave, which can impact costs and manufacturing lead times." (www.intouch-quality.com/blog/4-sewing-stitches-used-in-manufacturing-and-their-benefits)

Properties of Sewing Stitches in Manufacturing

Before we look at specific stitches, it is important to understand how to evaluate them so one can oversee exactly what one wants to form in garments. When designing or inspecting a garment, analysis of seams and stitches should include stitches per inch, seam strength and the size, consistency and tension of the stitches. One will want to factor these properties of different stitching techniques into the design of the garment, depending on how it is meant to be worn and used.

Stitches Per Inch

Looking at a garment—or an order of garments—one can form a rough idea of the length and quality of its stitching by noting its stitches per inch (SPI). A higher SPI indicates greater stitch density and often higher quality stitching. More short stitches typically mean there are stronger connections at the seams. In some cases, more decorative designs also call for a higher SPI.

Stitches Per Inch

Looking at a garment—or an order of garments—one can form a rough idea of the length and quality of its stitching by noting its stitches per inch (SPI). A higher SPI indicates greater stitch density and often higher quality stitching. More short stitches typically mean there are stronger connections at the seams. In some cases, more decorative designs also call for a higher SPI.

Conversely, a lower SPI often indicates lower quality. Garments with a low SPI are typically less durable, have long stitches and are more prone to snagging. The main advantage of a low SPI in garments is that sewing requires less thread. As a result, it is often faster and less expensive to produce garments with a lower SPI. A garment with a higher SPI will typically be more time and thread intensive, which can increase manufacturing costs.

Stitch Width, Depth, Consistency and Tension

Aside from the indications of length that SPI offers, garment manufacturers should also consider stitch width and depth. Stitch width is the distance between the lines of the outermost parts of the stitches. Stitch depth is the distance between a stitch's upper and lower surfaces.

Stitch consistency is the regularity of how each stitch is formed in a row of stitches and is important not only for the structural integrity of a garment, but also for its appearance. Consistency is a highly valued quality in luxury garments. When a factory worker makes a mistake stitching a garment, that irregularity can also cause a weak point in the seam of the garment.

Thread tension is the balance of force on the threads that eventually form the stitch. Too much tension can cause seam puckering, unbalanced stitch formation and uneven stitches. Too little tension can leave loose, uneven stitches and excessive looping. Without the right amount of tension, seams can become misshapen or susceptible to unraveling.

Seam Strength

Together, these properties contribute to seam strength in a garment. SPI, specifically, is used in formulas for common stitches to determine how much force a seam can resist before breaking. This knowledge is important because it allows for pass-fail testing of garments during inspection based on quantitative measurements.

The estimated seam strength formulas for two common sewing stitches used in manufacturing are:

Multithread chain stitch: SPI×thread strength (lbs)× 1.7=seam strength (lbs)

Lockstitch: SPI×thread strength (lbs)×1.5=seam strength (lbs)

One can incorporate the seam strength one wants in the garment design by using this formula.

One may not need high seam strength in a silk scarf, for example. But greater seam strength is usually very important to the functionality of construction work gloves. Whatever clothing one is manufacturing, it helps to have an idea of desired stitching properties and seam strength so that garments meet customer expectations.

4 Common Sewing Stitches Used in Garment Manufacturing

Considering the wide variety of stitches used in garment manufacturing, the American Society for Testing and Materials (ASTM) created a taxonomy for them known as ASTM D 6193. The International Organization for Standardization (ISO) also has a classification system, ISO 4915:1991. Throughout the remainder of this article, this disclosure will refer to ASTM's grouping.

Each general stich type is classified as class "100", "200", "300" and so on. Variations of these stitch types are further distinguished by digit endings within that group. For example, lock stitches are the class 300 category. A class "304" stitch refers to a zigzag lockstitch. Sometimes thread count separates these stiches and, in other cases, style. No matter the difference, by using these standard industry specifications, it becomes much easier to communicate with factories and designers about stitching needs.

1. Chain Stitch

The chain stitch falls into class 100 and is created when two or more sets of threads come together in a chain-like pattern. One or more needle threads penetrate the material being used and form a loop underneath it. Chain stitching is used frequently on decorative parts of clothing or anywhere else that needs an aesthetic touch-up. When sewn properly, it can leave an ornate, thick and textured line.

Since it is slightly larger than other stitch types, the chain stitch is also effective at filling up space in garments. The chain stitch has a nice-looking "roping" effect, which can lend to a better fading pattern where it is used.

But the beauty of chain stitches often comes at a cost. This stitching type uses more thread and, while more aesthetically pleasing, is not as strong as others. Seams joined with chain stitching often unravel easier. And the amount of extra sewing time for garments where chain stitching is used can add up, making this stitching type more laborious than others. These are important traits to consider when choosing to use chain stitching in garment manufacturing.

2. Multithread Chain Stitch

The multithread chain stitch, or double locked chain stitch, falls into class 400. It is formed when one or more needle threads move through the fabric and inter-loop with a group of looping threads on the underside of the garment. The resulting stitch looks different on the top and bottom of fabric.

While it may appear similar to a standard chain stitch, it is distinguished by its strength, durability and how it elongates better when extended. It can be used for elastic in waistbands, jackets, blazers, T-shirts, decorative stitching on belts and more. When sewn correctly, the multithread chain stitch is less vulnerable to seam puckering because it is located underneath the fabric rather than between its layers.

Some clear disadvantages exist with the multithread chain stitch. It consumes more thread and generally takes longer to sew, depending on the skill of workers and the quality of equipment they're using. And if a thread is damaged, the stitch can unravel easily, which might threaten the integrity of an entire seam. Many garment manufacturers prevent this by over-sewing or bar-tacking the seam for added reinforcement.

3. Lockstitch

Also known as single needle stitching, the class 300 lockstitch is made when two threads lock together at minor intervals. It is the result of a rotary hook catching a needle thread loop as it goes around the bobbin and interlocks two threads.

This stitch is very common as it is one of the fastest and cheapest to sew. On the inside and outside of the garment, this stitch will appear the same, whereas a chain stitch and multithread chain stitch will vary in these two areas. The lockstitch can become very tight, such as the 301 twin needle lockstitch. So it is typically not suitable for knit and elastic fabrics that need flexibility.

Not all lockstitches are appropriate for the same purposes. Some classes of lockstitches, like 313 and 314, are good for dress slacks and waistbands. Others, like the 304 zigzag lockstitch, are more appropriate for decorative stitching or particular parts of athletic wear. The suitability of a certain lockstitch for a garment depends on the stitching properties a customer requires.

4. Overlock Stitch

The class 500 overlock stitch goes by many other names, including overedge, overlock, serge, overcast or merrow. It is typically used in over-sewing, the sewing technique of creating a stitch over the edge of cut fabric. One group of thread goes around the edge of the fabric so that the threads from it are contained, which typically reinforces the inner stitching.

By choosing anywhere from one to five threads, the overlock stitch significantly changes in use:
  Class 501, one thread: end-to-end seaming and hems
  Class 502-504, two to three threads: edging and seaming
  Four threads: mock safety stitches that are strong and flexible
  Five threads: very strong safety stitches The overlock stitch is relatively flexible and often used for edge neatening of knitted fabrics. It is a popular choice among manufacturers of sportswear, dance clothing, spandex and other garments and materials that needs to stretch. Aside from these applications, the stitch is also used on the edge of garments for added aesthetics and to prevent fraying.

On the negative side, the overlock stitch is known for its very high thread consumption. But despite needing more thread for overlock stitches, overlock stitching machines are typically able to sew garments faster than other common sewing techniques.

Below is from it (pubs.nmsu.edu/_c/C214/)

Topstitching
  Straight.
  Attractive in placement.
  Stitch length and tension appropriate for design and fabric.

Stitching
  Stitch length and tension appropriate for fabric.
  Straight; free from tangles, knots, and skipped stitches.
  Beginning and ending of stitching locked in appropriate way.
  Loose threads cut off.
Seams
  Securely stitched, straight, flat, free from bulk.
  Stitches appropriate in size and tension.
  Fullness eased, as required.
  Crossed seams intersect correctly.
  Pressed in correct direction.
  Graded or trimmed and understitched, where appropriate.
  Fabric design matched, as possible.
  If finish used, no added bulk or tension.
  Construction notches trimmed off after seams are sewn.
  Free from raveling While latex is used as one example of employing the novel techniques provided herein, other compounds such as styrene butadiene, neoprene, isoprene, polyisoprene, polypropylene, and silicone rubber, vinyl, nitrile, polyurethane foam as well as combinations of these materials may also be used with the techniques of the current disclosure to form garments and/or articles.

The methods for sewing latex described herein produce reliable, reproducible results. To begin, one needs two sheets of semi-transparent paper with a low grams per square meter ("GSM") rating. The preferred paper is supplied on a paper roll with options for 45-60" width, 30 yard length, on dotted marking paper or pre gridded pattern paper. Material concepts or Goldstar Tool both supply good paper of this sort and manufacture in the USA. This roll is wide enough for just about any pattern piece needed to be sewn with option to order the 60" width. The paper hosts a "one-inch grid of sequential number 1-9 running vertically, interrupted by a line of letters A through J and a row of rectangles with X's inside. Every yard is marked a line of dots halfway between the alphanumeric markings, too. Translucent enough to see through to the pattern while durable enough to withstand pencil markings (and erasing), it is friendlier to use in comparison to tracing and tissue paper. Scissors and rotary cutters slice though no problem, so much so that a layer of pattern paper and the layer(s) of fabric can be cut together" (www.moodfabrics.com/dotted-pattern-paper-30-yards-11975). Manufactured in the USA. GSM is not listed but it is most likely between 50-70 GSM. The GSM is between newsprint and lighter textweight paper. This paper is supplied to many retailers.

Another paper that may be employed is Pacon Grid paper Roll-White sulphite tablet paper roll. This is the same weight as the paper listed above, but essentially gridded and not specialized for techniques that include cutting such as stitch and slash, making it slightly less durable. Depending on the sewing work, it can be more helpful having dots and letters in some designs or a fully gridded out paper in others. The paper comes in 0.5 inch grid and 1 inch grid.

One can draft designs intended to sew in pencil on top of this paper as well and erase without worrying about the paper ripping. This paper is not considered "transparent paper", but is see through similarly to the first one mentioned.

The paper is easy to cut without tearing, and has more weight than tissue and transparent paper, which range from 10-35 GSM. Lighter textweight paper is 35-GSM, and medium textweight paper is 70-100 GSM. For comparison, office printer paper is typically 70 to 100 GSM, 45-50 GSM for newsprint, 75-90 GSM for sketching paper (thick enough for pastels or charcoals).

The paper used for sewing preferably does not curl in the corners when sewing, which would happen if too thin paper is used in the sewing process.

This paper is really reliable because the weight is used for pattern making and drafting. Cutting and slashing can be done with this paper. This paper is easy to remove from the stitches in the last step of production without paper ripping or misplacement during the sewing process. When the paper rips and or moves while sewing it can mess up stitch direction and length.

3 Common Thread Sizing Systems

Tex (T):

Tex is the most consistent of the measuring methods. It uses a fixed length to measure the weight of a thread. Tex is the weight (in grams) of 1,000 meters of thread. Or, in other words, 1,000 meters of thread that weighs 1 gm.=1 Tex. The higher the Tex, the thicker the thread.

Denier Count (Td or d):

Denier also measures thread at a fixed length. It is the weight (in grams) of 9,000 meters (or 9 km) of thread. One might recognize the term from descriptions of nylon fabrics, which are often classified by the denier of the threads from which they are woven.

Commercial Sizes (V):

Commercial sizes are used for heavy-duty threads for sewing heavy upholstery, canvas or webbing. Commercial sizes are set sizes of 30, 46, 69, 92, 138, 207, 277, 346, 415 and 554. They are the thread's denier divided by 10. Commercial sizes are standard for marine grade thread. (www.sailrite.com/Selecting-the-Right-Thread-Size)

It would help if the collective sewing and quilting industry would choose a single standard and apply it across the board, but that has not happened yet and most likely is not going to happen in the future. The most commonly used classification in the U.S. is the weight standard. One will see threads labeled as variations of the following: 30 wt., 40 wt., or 50 wt. Outside the U.S., these standards are not followed or understood. This method of classifying thread is the most popular and used for quilting and sewing, but it is not the most accurate. There is confusion surrounding what exactly makes a 50 wt. thread a 50 wt. thread.

Not too long ago, there were only three common sizes of thread in the U.S. Thin threads were labeled 50 wt., regular weight threads were labeled 40 wt., and heavy threads were labeled 30 wt. These numbers, 30, 40, and 50, were borrowed from another standard, known as the Gunze Count standard, established by thread factories in Japan. If a thread was labeled as #40 or 40/3 in Japan, it was labeled as a 40 wt. thread in the U.S. Likewise, if a thread was labeled #50 or 50/2 or 50/3 in Japan, it was defined as a 50 wt. thread in the U.S.

The numbers that trail the slash are the number of plies that make the final, stitch-ready thread. All thread, except for monofilament threads like MonoPoly consist of thin strands, called plies. These plies are twisted together to create the thread we use to sew and quilt.

The Tex system (most likely derived from the word textile) was created as a new standard of consistent thread measurement and intended to replace all other methods of measurement of threads. It has not quite achieved that goal because quilters love the weight standard and the number standard (for example, 40 wt. or #50) and embroiderers are used to the denier standard (120 d/2). Because the International Organization for Standardization (IOS) has adopted the Tex system, it will probably continue to gain in popularity so it would be advantageous to understand it.

Tex is an accurate measurement and is considered a direct numbering system, meaning the higher the Tex number, the heavier the thread. On the other hand, the weight system, most popular in the U.S., is not a direct numbering system because the larger the number (30 wt., 40 wt., 50. wt., 60 wt.), the finer the thread. That can be confusing.

The Tex standard uses 1,000 meters of thread per gram as the starting point. This means if 1,000 meters of thread weighs one gram, it is Tex 1. If 1,000 meters of thread weighs 25 grams, it is Tex 25.) (www.superiorthreads.com/education/thread-measurement)

The higher the weight number, the thinner the thread will be. Spool numbers 12-18 are heavyweight. 15 is an ideal weight. The weight for thread is determined by how long the thread needs to be in order to make one kilogram of thread. For example, if the thread takes 12 kilometers to make one kilo, it is considered heavy-duty thread. Light weight thread takes around 50 kilometers to make one kilo. A thread labeled 40 weight means 40 kilometers of that thread make up one kilo. (sewingiscool.com/sewing-with-heavy-duty-thread/).

One preferred thread for regular sewing machine stitching (industrial and home sewing machine) is Coats & Clark Inc. Dual Duty XP Heavy Duty Thread (15 weight, 3 ply, 25 yards). This thread is durable and weather-resistant. This thread offers ample and consistent tension while maintaining excellent stitch formation. For stitches that one wants to make more obvious, for example for statement stitches or topstitching. The current disclosures uses Güterman Extra Strong Thread (Tex is M 782, 40 weight, 109 yards). This is a strong polyester, pucker and fade resistant lightweight extra strong thread. This thread is preferred for decorative things and not seams that will not be seen. The thread is heavyweight polyester-wrapped core-spun thread and what is unique about this thread is its excellent compatibility with lightweight fabrics. The current disclosure also employs its sister product, Gutermann Top Stitch Heavy Duty Thread for decorative elements and top stitching. The project dictates the decorative threads to use.

In regards to using the serging or coverstitch machine, the current disclosure uses a different thread. Selric High Strength Polyester Thread (1500 Yards 210 D/3 #69 T70). This thread is high strength and compatible with these machines and how much thread they consume at a time—it is durable and can withstand high-speed sewing through thick and tough materials such as leather or vinyl. This thread is very durable and can be used for outdoor use such as on awnings, tents, upholstery, etc. It is resistant to UV rays, mildew, abrasion, and high temperatures. Other brands and similar weighted thread can be used on latex, however, the current disclosure has found the most success with the products listed above. Other threads that can have compatibility with latex sewing is nylon thread, polyester thread, KEVLAR® thread, monofilament thread, upholstery thread, embroidery thread, fire retardant embroidery, fire retardant sewing, polypropylene thread, cotton thread, and waxed thread to name a few. Coats Outdoor Living Thread is equally reliable. It is a heavy weight outdoor thread weighing 12, 3 ply, 200 yards. It is UV and water resistant, and can resist almost any kind of weather-related abuse. Serging is unique in that it can handle somewhat thinner threads than a normal sewing machine because of its looping process building an interlocking stability. Maxi-Lock is a serger thread that can withstand the high speeds and tension that accompany serging (40 weight, 3000 yards).

The needle is also an important element to consider when sewing latex with a normal sewing machine. Different sizes have had success. 80/12, 90/14, 100/16, 110/18 or 120/20 are all suitable depending on what is being sewn with the latex. Sometimes one may add in other fabrics behind the latex for decorative value and therefore require a thicker needle. The current disclosure has not had to change serger machine's needles to work with latex.

A Teflon or Roller Pressure Foot on the sewing machine is helpful when using these heavy weight threads, but they are not necessary at all. These feet lessen the amount of slippage. (sewingiscool.com/sewing-with-heavy-duty-thread/). "Every sewing machine is compatible with a specific type of needle which is called the needle system. The needle system is typically determined by the needle's physical attributes such as length, thickness etc. It is of utmost importance to only use the correct needle system for the machine. The needle system is often listed in the machine's instruction manual, technical sheet, product listing and on the package of needles.

The needle system often consists of two groups of numbers or letters with an X separating them. For example, 135×17 or DP×17. Sometimes the needle system consists of a group of numbers with a letter at the end (134R) and sometimes just a series of numbers (134-35) NEEDLE SIZES A needle's size refers to the thickness/gauge of the needle. The larger the needle size, the thicker/stronger the needle. One should use the right needle size corresponding to the thickness of the material one is sewing and the size of the thread one is using.

For example, if one is using size #69 thread, one should use size #18 needle. If one is using size #138 thread, one should use size #23 needle.

The metric sizing system is numbered from size 35 to 250, which corresponds to the diameter of the needle in the hundredths of a millimeter. Size 100 is one millimeter thick.

The Singer or US sizing system is a more common standard and is numbered from 6 to 28.

One will often see both the metric and Singer/US size on a package of needles. For example, size 90/14 (metric/Singer size).

Needle Points

The needle point is the "point" or tip of the needle. There are different needle points available, which will determine both the appearance of the hole in the material and the appearance of the stitch.

R Point Needles

R point needles are known as universal or Round point needles, used for any general-purpose sewing. R point needles are the standard for lockstitch machines and are commonly used for woven fabrics and soft leather. R point needles will produce a slightly angled or irregular stitch. The thread will be slightly elevated.

DI or DIA Point Needles

DI or DIA point needles feature a diamond shaped point which cuts a quadruple edge hole in the leather and produces very straight stitches. The sewn thread is slightly elevated and stitch holes are visible. Diamond point needles are commonly used for leather products such as belts, bags, footwear, upholstery, suitcases and more.

S or NCR Point Needles

S or NCR point needles, known as Narrow Cross Point, feature a cutting point with a lens-shaped cross-section. The incision follows the direction of the seam resulting in very straight stitches. The sewn thread is set deeper into the material. S or NCR point needles are commonly used for footwear, leather bags, belts, garments and upholstery.

LR Point Needles

LR point needles cut the leather to the right at a 45-degree angle in the direction of the sewing, producing a slight to medium slanted stitch formation. The sewn thread is slightly elevated and stich holes are visible. LR point needles are commonly used for decorative seams on footwear, leather bags, leather garments and anything from soft to medium/hard leather.

While many other needle systems, sizes and points exist, the current disclosure has narrowed down its selection to the most common ones and to those compatible with industrial machines. The preferred needle point is R.

Latex may be sourced from Radical Rubber Ltd. or other sources. The company sells latex depending on weight/thickness. The thicker the latex fabric, the more expensive it is per meter. Radical Rubber sells by meter and not per yard because it is located in the UK and they use a different system of measurement, the current disclosure uses three different weights for latex creations, but any weight is sewable. One preferred thickness of latex is 0.25 mm. The current disclosure uses the weights 0.25 mm, 0.40 mm, and 0.5 mm. The latex is produced in weights 0.25 mm, 0.40 mm, 0.50 mm, 0.60 mm, 0.70 mm, 0.80 mm, and 1.05 mm—all of which may be employed herein. The natural latex sheeting is made from pure natural latex, meaning it is free from silicone and other additives. The right side is glossy whereas the wrongside is roughened. This latex matches and or exceeds standards for the fashion industry, and has been laboratory tested to ensure compliance with the medical standard requirements. Radical Rubber was developed in association with Libidex Ltd. and is located in London, England, but their products are manufactured in Malaysia. The rubber is 'Standard Malaysian Rubber" which is a term used by professional bodies and chemists to refer to the best quality benchmark for all technically specified rubbers (radicalrubber.co.uk/pages/about-us)

The current disclosure's preferred thread for regular sewing machine stitching (industrial and home sewing machine) is Coats & Clark Inc. Dual Duty Heavy Duty Thread is manufactured in Mexico, and the company is run by Spinrite.

Güterman Extra Strong Thread is produced by A&E GÜTERMANN—PART OF ELEVATE TEXTILES, INC. Manufactured in Mexico.

Selric High Strength Polyester Thread is manufactured by Selric in China.

Maxi-Lock Serger Thread, manufacturer is American & Efird in USA

Preferred paper: Goldstar Tool dotted pattern paper, 48" in width, manufactured in USA. Dotted Marking Paper, 48"—

Preferred needles: Singer Heavy Duty: Denim and Universal & Leather ASST (100/16, 100/16, 110/18, 110/18, 90/14). Singer is manufactured by SVP Worldwide, and made in China & Vietnam.

Herein, the term "adjacent" may be used to mean latex, or similar materials, or fabric pieces laid atop at least a portion of one another, or edges of latex, or similar material, or fabric pieces placed adjoining one another "end to end" so that the pieces do not overlap but instead abut one another at their respective edges. Thus, the current disclosure may form garments made of latex containing stitching formed only in that piece of latex and unaffixed to other pieces of latex or fabric, pieces of latex stitched atop or abutting one another, and/or pieces of latex stitched atop or abutting at least one piece of fabric as well as garments containing all of these variations.

Herein, the term "stitch" may be used to mean a loop of material, such as thread, yarn, or other materials, joining a piece of latex to itself, joining a first piece of latex to a second piece of latex, material or fabric either by the stich piercing from the first piece of latex through the second piece of latex, material, or fabric as they lay atop one another in a stacked or layered formation or joining a first piece of latex end-to-end with a second piece of latex, material or fabric with the loop of material "bridging the gap" between the two pieces and pulling the pieces together. Both of these forms of "stitch" may be used in the same garment.

Further, the methods and techniques, as well as garments and articles created via the methods and techniques described herein, do not employ adhesives to secure the stitching and/or secure latex to latex, latex to fabric, or latex to any other material. This means the current disclosures does not need to employ: emulsion adhesives—such as polyvinyl acetate (PVA); multi-component adhesives; cyanoacrylate adhesive; polyurethane adhesive; pressure-sensitive adhesives; contact adhesives; hot-melt adhesives; UV light curing acrylic adhesives, and/or solvent cement or any other types of adhesives or glues. The current disclosure forms, strong, clean, aesthetically pleasing seams/stitching using only the sewing/stitching techniques descried herein to modify a piece of latex standing alone, join latex to other latex, or join latex to fabrics or other materials.

Figure 2:
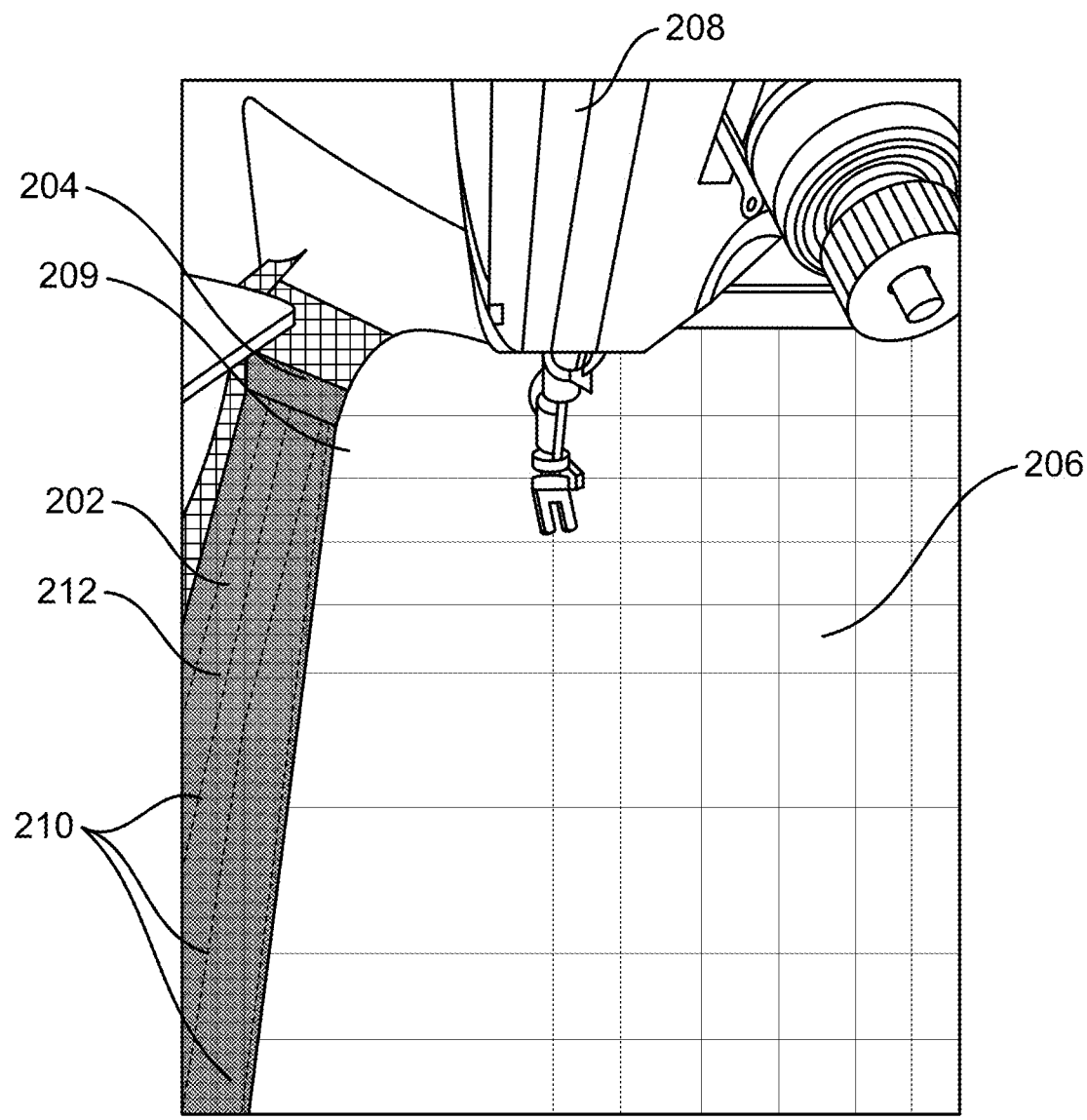
FIG. 2 shows a photograph of latex being sewn/stitched to fabric per the methods and techniques of the current disclosure.

To begin, see FIG. 1, one can "grid out" the low GSM paper via marking guide lines 102 on surface 104 of the low GSM paper 106 using a marker 108, such as fabric markers. Pre-gridded paper, with patterns already present on surface 104 may also be used to help map out the design to be rendered from the latex. This includes creating a garment pattern formed from various pieces stitched together to form a garment. Pre-gridded paper Pre-gridded alphanumerical paper by Goldstar Tool or Dotted Marking Paper manufactured by Material Concepts, Inc. may be purchased on rolls so that the maker is not limited by the length of the paper, only the width, which has not happened due to the two extremely large width sizes available may be purchased on rolls so that the user is not limited by the length of the paper, only the width. Next, see FIG. 2, one places a sheet of latex 202 between a first piece of low GSM paper 204 and a second piece of low GMS paper 206. Thus, latex or a similar material is placed between a first substrate and second substrate to form a multi-layer protective support construct with latex between the first and second substrate. For sake of convenience, first low GSM paper sheet 204 may be referred to as a "top" sheet and second low GSM sheet 206 may be referred to as a "bottom" sheet. Placing the latex between the two sheets of GSM paper to form a multi-layer protective support construct 209 "sandwiches" latex 202 so that, while being sewn, the multi-layer protective support 209 structure prevents sewing device 208, which may be a sewing machine, any sewing machine has the ability to work with the methods disclosed herein. At first, working on a home sewing machine was actually easier than an industrial machine because the motor is not as strong and when unfamiliar with the method it is the easiest first approach. A heavy duty home sewing machine will be able to sew up to 0.50 mm but the current disclosure suggests using 0.25 mm so the machine does not encounter any issues from the thickness of the material since it a domestic machine and it has caps on how thick of materials they can work with. The home/domestic sewing machine does not produce as high quality stitches as an industrial machine, which is why industrial machines are selected for use herein but not solely limited to same. Industrial machines produce more dependable quality, can sew through really thick materials, and do not have a cap on how fast it can go, meaning one can sew the latex as fast as one is capable of going. Industrial machines are built for long tasks as well, making them ideal for latex sewing since it takes longer than normal sewing., "pulling" on latex 202 or catching and ripping same while stitches 210 are placed into latex 202 via thread 212. The sandwiched latex and sheets of GSM are then fed into a sewing machine 208 or other device.

The idea for the current disclosure came from endless hours of research. Major parts of research included smocked, embroidered, gathered, and quilted accents from garments that the inventor wanted to incorporate. The inventor experience varied amounts of success from different methods, tracing paper, vellum, thicker weighted paper, embroidery stabilizer, tissue paper, gridded, and marked dotted paper were some of the materials used. The inventor's final collection focused on latex sewing. The present disclosure focused on making outerwear/ready to wear garments either singularly of latex or with latex layered on top of fabric with or without manipulations.

The sandwiched latex and sheets of paper are then fed into a sewing machine 208 or other device. It is important to feed the paper, latex, and paper into the machine slowly in the beginning making sure no fabric is dislodged. Pinning latex and paper layers together is recommenced so there is no slippage. Sew three stiches forward and two/three back to create a strong thread anchor so the stitches will not come undone. Leave the needle in the machine so one can quickly examine the paper sandwiched latex has not been moved from the anchoring stitch. If no puckering or slippage has occurred, continue sewing. Proceed with caution, making sure to feel the latex has not puckered in any areas while sewing. A user may use their left thumb while sewing to feel for any areas that the latex could have moved. All fabric moves when being stitched, so one needs to prepare to take periodic breaks to check on the flatness of the latex sheeting being worked and that no areas have stuck together.

If the paper and latex lie completely flat on the feeder of the machine and one does not see/feel movement in the pattern piece, one can proceed and sew. Check pre-pinned pieces periodically to make sure no slippage has occurred. It is harder to see if the fabric has moved because it is sandwiched in paper, going slow and at one's own pace depending on sewing ability helps prevent slippage errors. One can leave all of the paper sewn in place and rip when one has completed sewing. Once finished sewing, anchor the stitch backwards 3 stitches and forward ⅔ stitches. Cut thread from bobbin and thread fed through the needle. Remove from machine. Pick paper off of the latex and out of the seams. It comes off quite easily when pulled and rarely becomes stuck in the seams/stitches. If this occurs, one can use a tweezer to pick put any remaining paper pieces. The thread and latex is very durable, so one should not worry about pulling a stitch out in the process of removing paper. Once sewn, the latex is extremely durable have created pullover garments such as bras with no closure and not a single garment has ripped in the over two years of experimenting with this materials sew-ability.

Figure 3:
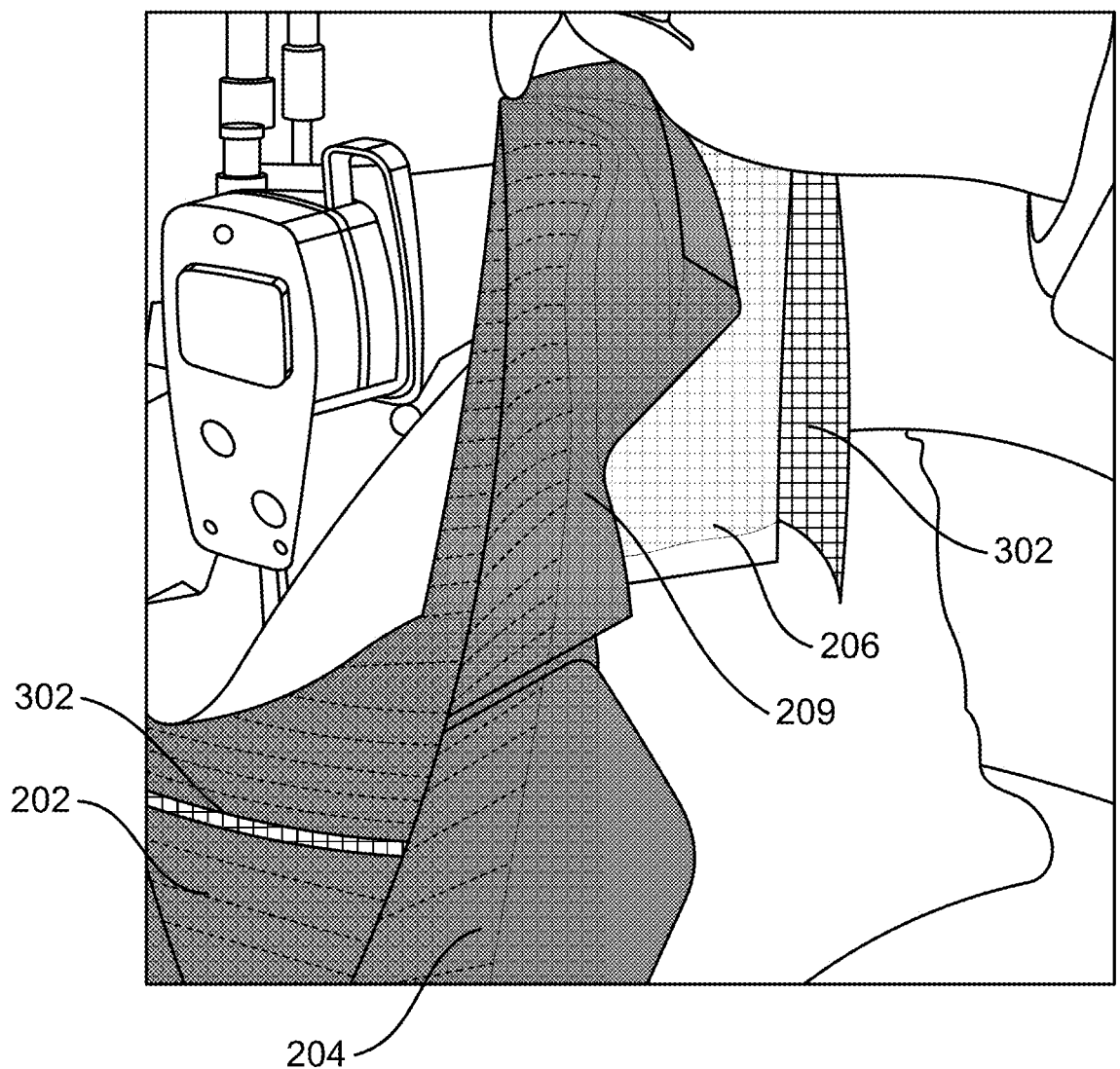
FIG. 3 shows a photograph of latex sewn to fabric with the first substrate and second substrate "sandwiching" the fabric and latex between the two.

FIG. 3 shows a variation of the current disclosure wherein latex 202 is "sandwiched" between first GSM sheet 204 and at least one fabric layer 302, such as gingham fabric layered over cotton batting in this example. Any and all fabrics can be used adjacently with latex via the methods and techniques disclosed herein. Herein, only first GSM sheet 204 is needed to ensure sewing of latex 202 whereas fabric layer 302 will act in place of second sheet 206, not shown. In this context, multiple layers of latex and cloth may be sandwiched between first sheet 204 and fabric layer 302. Additional layers may comprise but are not limited to cotton gingham 304 and batting 306, which can be sewn to latex 202. Indeed, one can, as with other iterations of the present disclosure, with latex 202 placed between first sheet 204 and bottom layer 308, which may be a fabric layer 302, haberdashery not limited to any particular type can be sewn under or between fabric/latex to provide structure or decorative appeal. Examples include but are not limited to plastic and metal corset boning, spiral boning, flat boning, synthetic whalebone, underbusks, busks, bra underwire, interfacing (woven, non-woven, knit), cording, feed the latex and fabric "sandwich" into the sewing machine or hand sew the construct. This method may be used for sewing latex singularly, such as sewing latex to latex, or it may be used with a sheet of fabric 302. There is a difference when sewing fabric of any kind including but not limited to batting as well. When one has a fabric replacing the bottom layer of paper one does not need the second paper sheet. The second or bottom paper simply stops the machine from eating the latex and the latex becoming stuck inside the machine. Various images provided herein are only sewn with one piece of paper, which may be a piece of painters paper that is the correct weight. The sewing device thread tension and weight may be adjusted for this process depending on how many layers of fabric 302 are being stitched to latex 202.

With every material sewn, the user must first be aware of thread tension and how to adjust. One cannot get the correct tension without first correctly threading the sewing machine. There is not one universal way to thread a sewing machine, however, there is a correct approach to each individual machine. Every sewing machine (home and industrial) have four devices that regulate the tension. These are thread guides, the tension regulator for upper thread, the bobbin-case spring for bobbin thread, and tension discs. All of these working together ensure that the same amount of thread simultaneously allows from the needle and bobbin. These functioning in harmony should produce a symmetrical stitch. "A lot of sewers avoid the tension dials like the plague certain they'll only make matter worse if they make adjustments. In fact there is nothing mysterious about setting and adjusting thread tensions on a sewing machine, whatever its make and model." www.threadsmagazine.com/2008/11/02/understanding-thread-tension.

The tension discs and tension regulator together are called the tension assembly. The tension discs squeeze the thread as it passes between them, while the tension regulator controls the amount of pressure on the discs. On older machines, there are only two tension discs, controlled by a screw or knob. On newer models there are three discs controlled by a dial or key pad on the front of the machine, which can regulate two threads at once.

In either case, the tension regulator is elementary: When adjusted to a higher number (turned clockwise), the discs move closer together, increasing the amount of pressure. Turned to a lower number (counterclockwise), the discs move apart, decreasing the pressure. Using a thicker thread without resetting the dial will increase the pressure and cause the upper thread flow to decrease, unless one has a newer machine that makes automatic upper-tension adjustments. Since the bobbin tension is not self-adjusting, the lower tension may need to be adjusted manually to match. In addition to guiding the thread along its path, each thread guide exerts a small amount of resistance on the thread, adding to the tension from the discs to achieve balanced tension. The sewer must note that because we will use thick, heavy-duty thread to stitch the latex, the tension dials and bobbin spring pressure will already be increased because of the thread running through the bobbin spring and tension dials. There are a few methods to recognize balanced tensions. The seams are their strongest and most elastic when the stitched lines are even and look good on both sides of the fabric. An easy way to spot if the sewn latex has unbalanced tension is that the stitch lines have loops or knots at the end of each stitch. For example, if one were to see the needle thread showing om the wrong side of the fabric, this means the needle tension is too loose or the bobbin thread is too tight. If both tensions are too loose, the seam will gap when pressed open and expose the threads between pieces of fabric, and on the other hand if tension is too tight, the seam will pucker.

Figure 4:
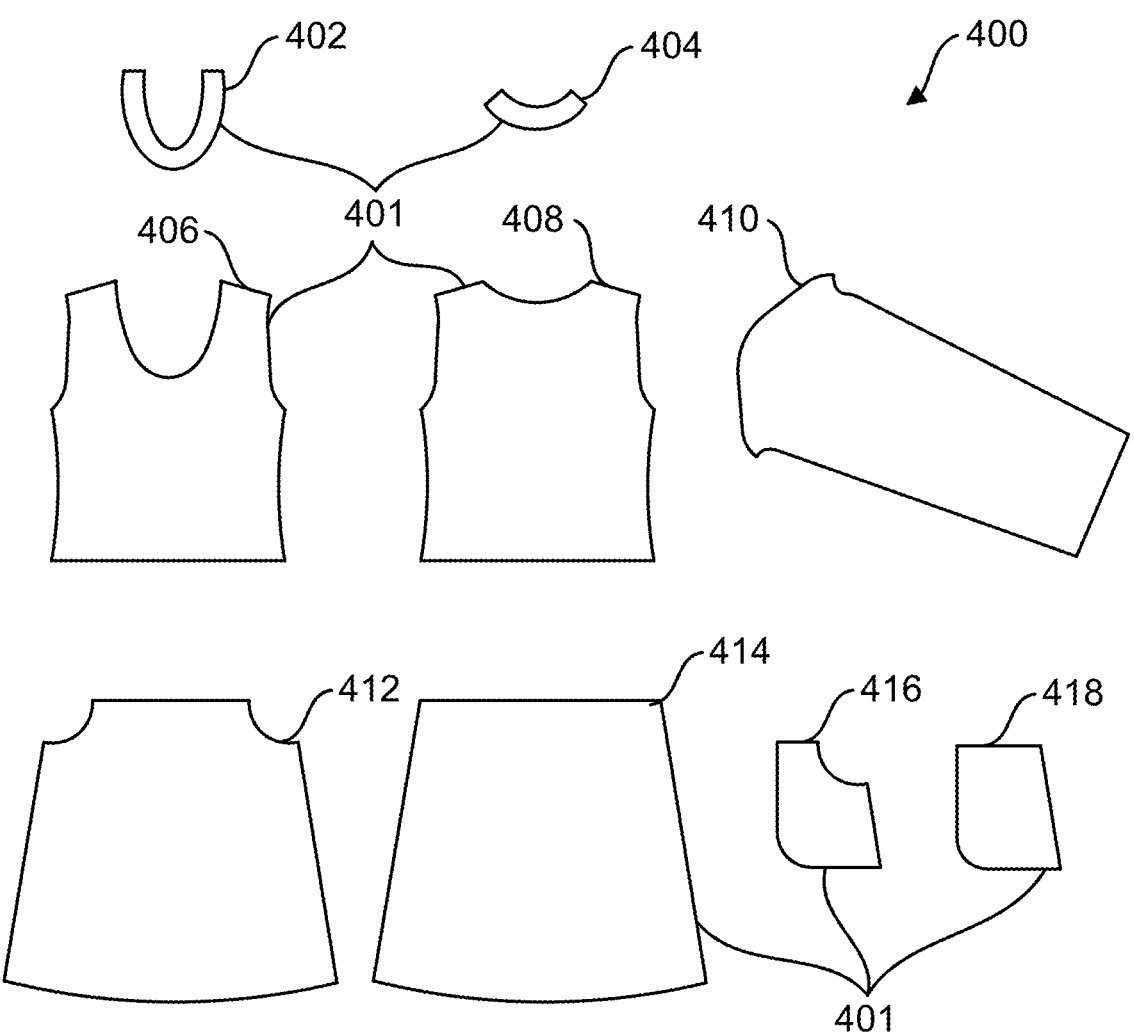
FIG. 4 shows a photograph of one embodiment of a clothing pattern that may be used with the current disclosure.

The method of the current disclosure may be used to form any and all parts of a piece of clothing such as pattern blocks used to assemble a piece of clothing. For instance, FIG. 4 shows a dress pattern 400 that includes various pattern blocks 401 including, but not limited to, a front neckline facing 402, back neckline facing 404, front shirt panel 406, back shirt panel 408, sleeve 410, front skirt panel 412, back skirt panel 414, and front pocket 416, and back pocket 418. All of these pieces may be comprised solely of latex and stitched together or may include various parts of pattern 400 made from latex and other parts made from at least one type of fabric and sewn together or layered parts wherein fabric and latex are placed adjacent one another and sewn together. The current disclosure overcomes the past failings wherein attempts to stitch latex have failed and enable the user to form various types of garments using the methods and techniques disclosed herein.

Figure 5:
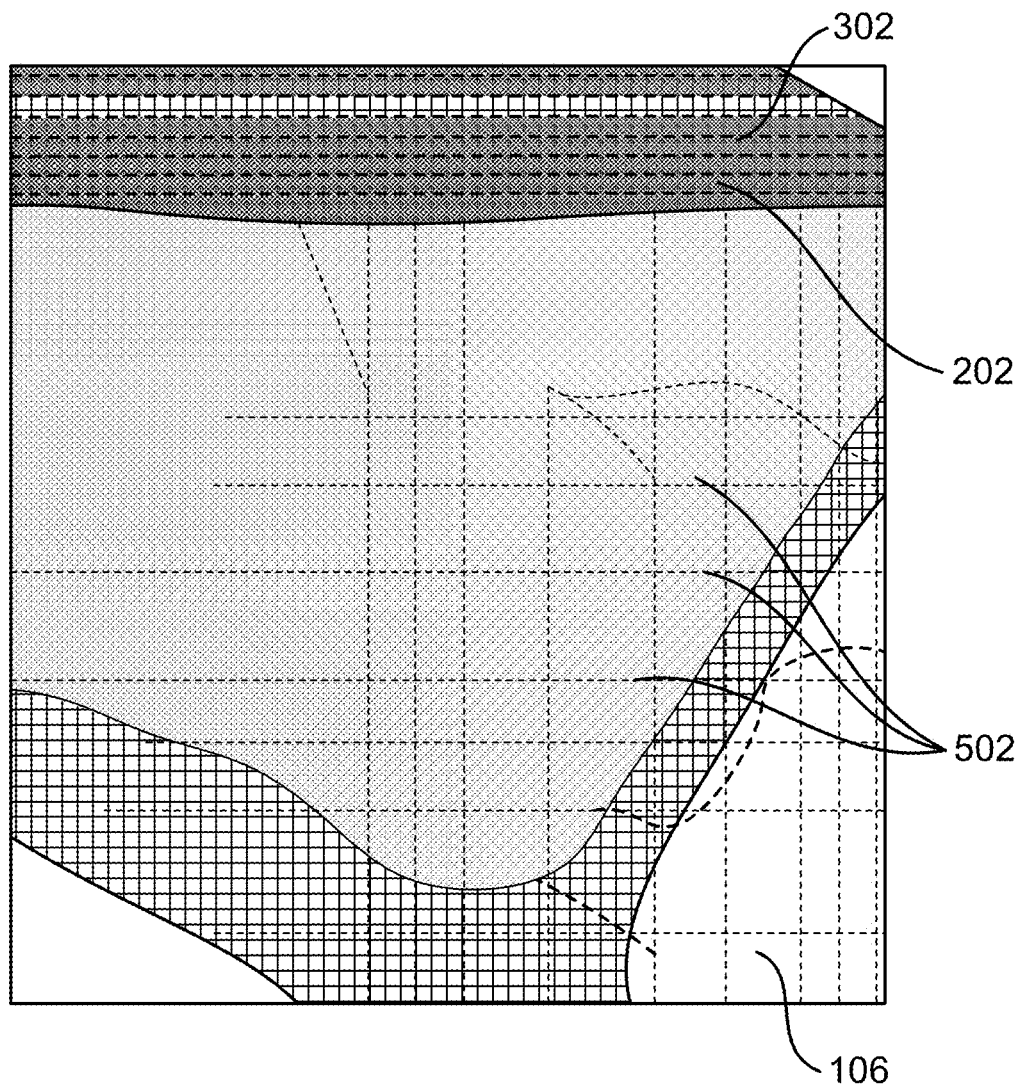
FIG. 5 shows a photograph of quilting lines that may be created and sewn into latex via the current disclosure.

FIG. 5 shows an example of all quilting/stitching lines 502 created and sewn on latex 202 and fabric 302 prior to removal of low GSM paper 106 wherein removal of low GSM paper 106 will show clean stitched lines on/between latex 202 and fabric 302.

Figure 6:
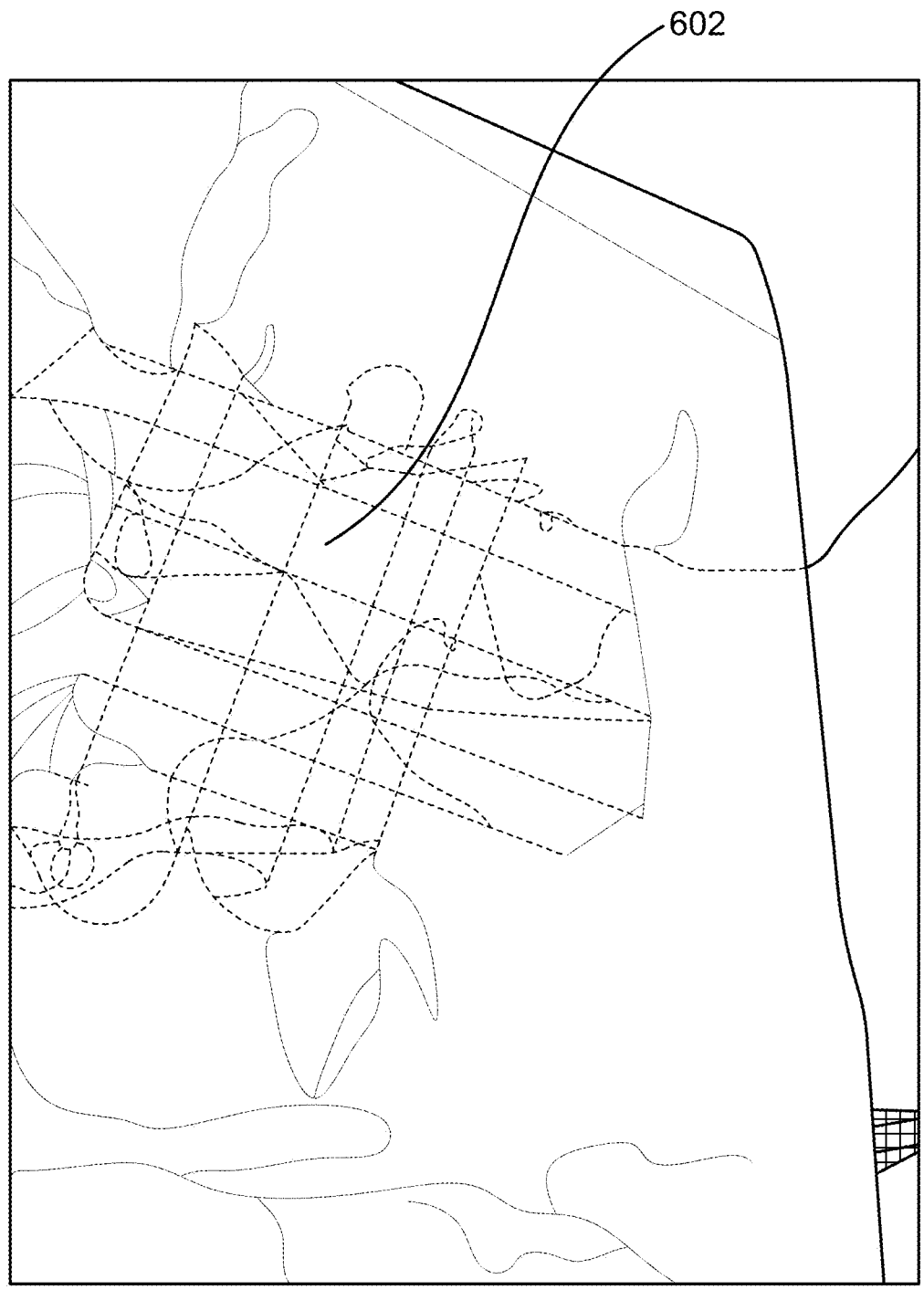
FIG. 6 shows a photograph of an underside view of a completed sewn latex construct of the current disclosure with the GSM sheet in placed.

FIG. 6 shows underside 602 of second GSM sheet 206 prior to removal of second GSM sheet 206.

Figure 7:
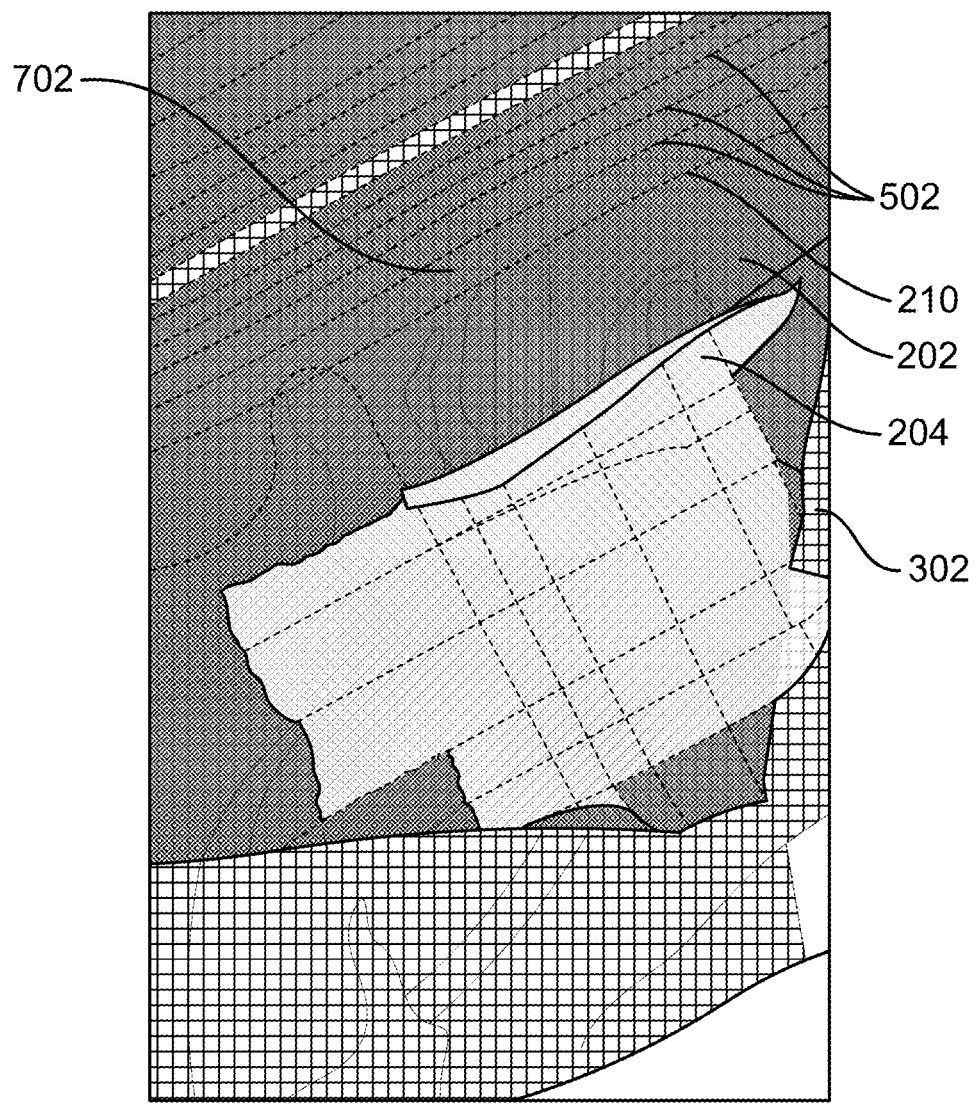
FIG. 7 shows a photograph of a completed sewn latex construct of the current disclosure with the GSM sheet partially removed.
Figure 8:
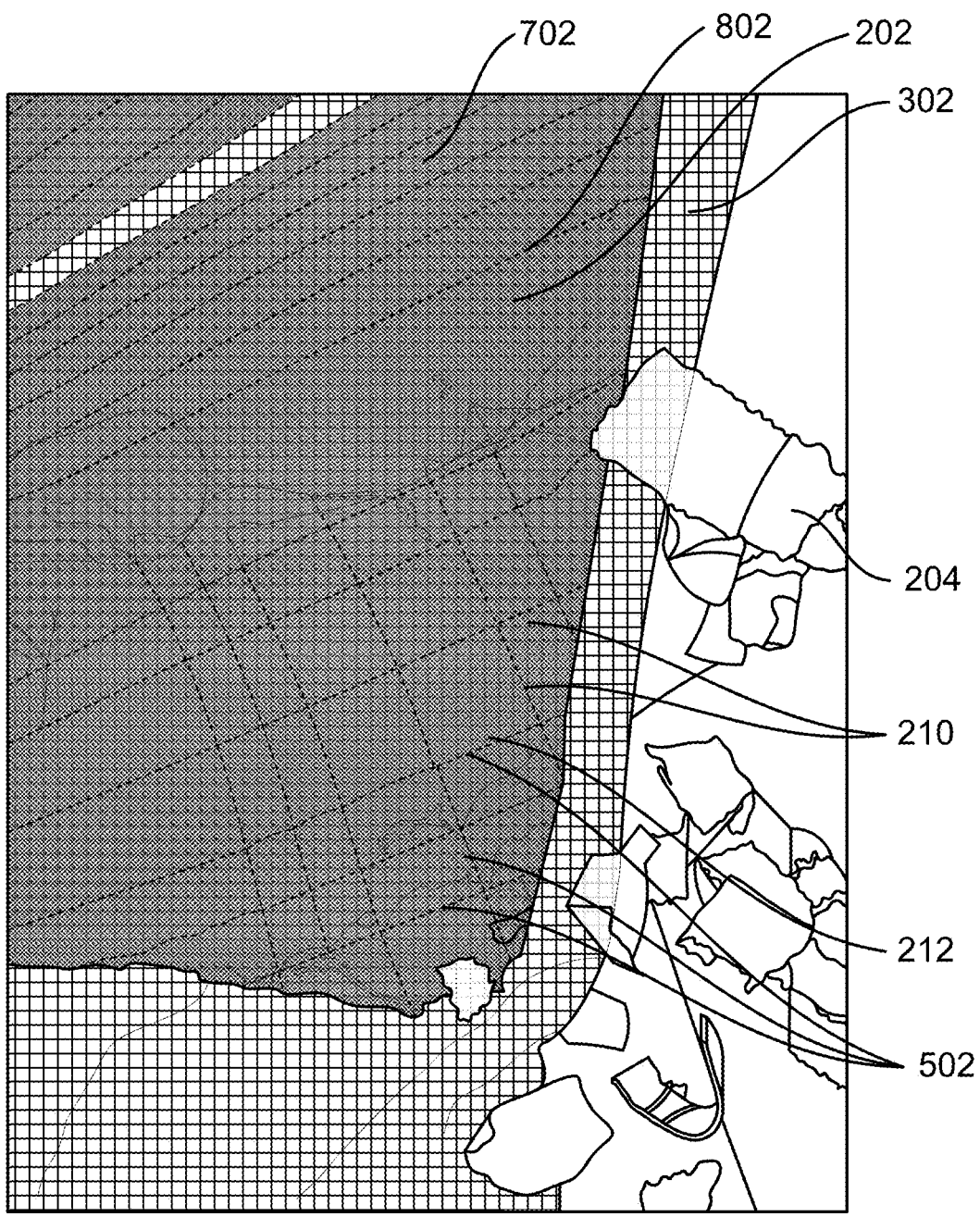
FIG. 8 shows a photograph of a completed sewn latex construct of the current disclosure with the GSM sheets removed.

FIG. 7 shows partial removal of first GSM sheet 204 revealing latex manipulation 702. Various manipulates such as quilting, gathering, smocking, piping, top stitching, decorative stitching, patchwork, pleating, shirring, stitch-and-slash, machine embroidery, hand embroidery, pleating, and/or applique FIG. 8 shows first GSM sheet 204 removed (the same will be done for second GSM sheet 206, not shown) to reveal the finished latex manipulation 702, herein, latex stitched atop fabric with clean, secure stitches with no ripping, tearing, or dilated thread intersect openings 802 where thread 212 enters latex 202 and pierces fabric 302. Until the present disclosure, this was considered impossible with respect to latex, see supra in the Background section, and demonstrates the novelty and industrial application of the current disclosure.

Figure 9:
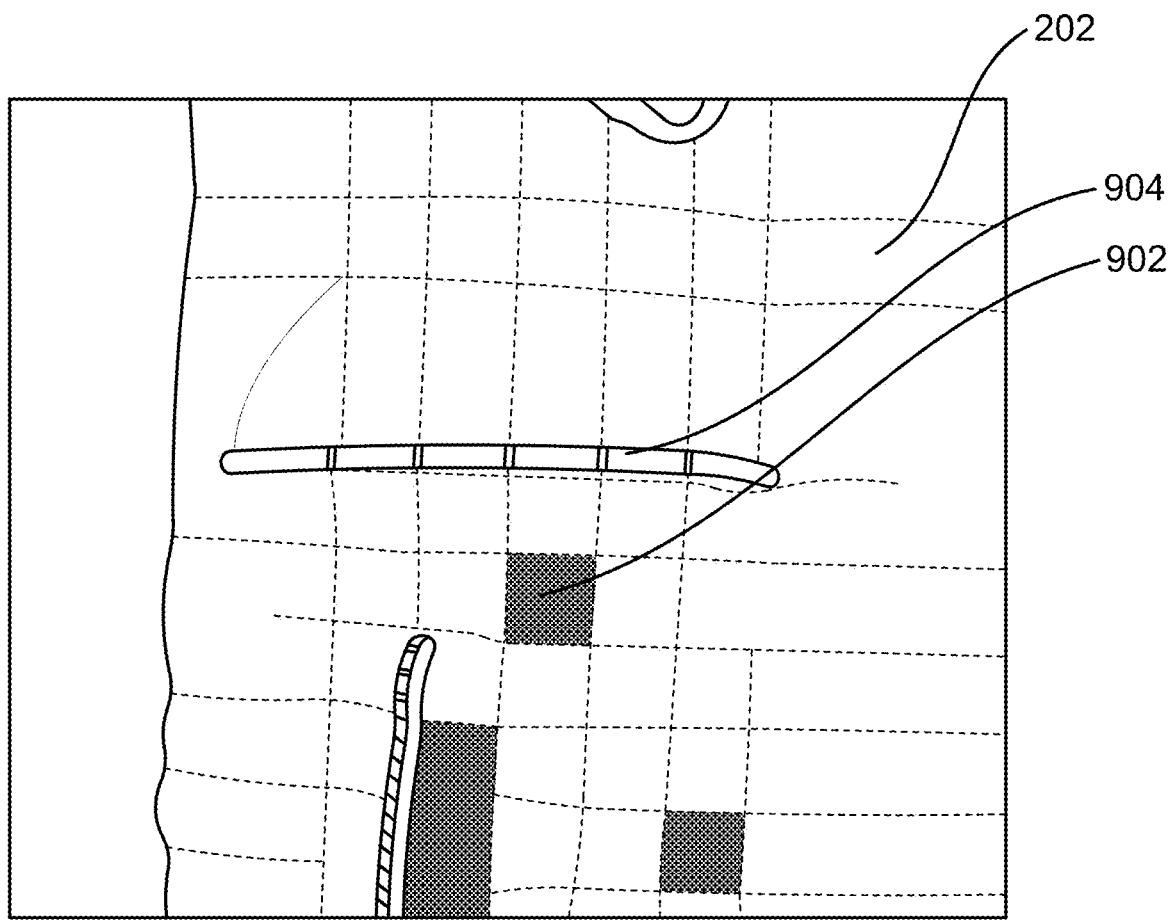
FIG. 9 shows a photograph of quilted latex sewn over cotton and wadding/batting per the methods of the current disclosure.

FIG. 9 shows one application of the current disclosure with latex 202 sewn over cotton 902 and piping 904. Wadding/piping 904 may be a type or trim or embellishment to form a pipe inserted into the fabric to create a "pipe" to define the edges or style lines of garment. Wadding, meanwhile, is the UK terminology for padding. Batting, not shown, may also be included in the garments as a layer of insulation. Batting may be the filling of quilts or other fabric constructions. Batting determines the warmth, how the quilting shows, and the quilting density. Batting is the inner layer of a "quilt sandwich."

Figure 10:
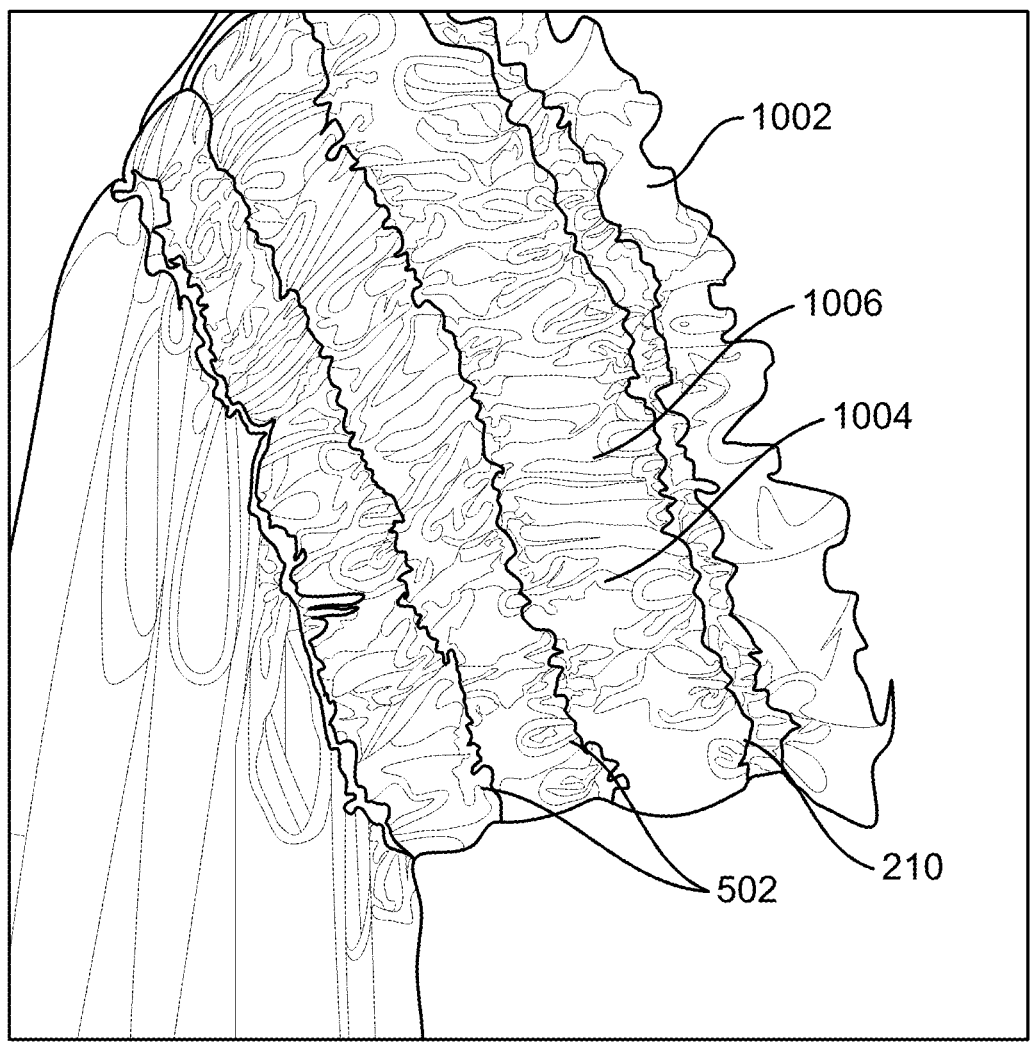
FIG. 10 shows a photograph of gathered latex made via the methods and techniques of the current disclosure.

FIG. 10 shows a single sheet of latex 1002 sewn in a gathered formation 1004 via the methods and techniques of the current disclosure with no fabric included, while still producing crisp, secure stitches 210 and aesthetically pleasing gather/shearing/smocking 1006 and gathered stitch lines 502. Thread manipulation can be used to product gathering, shirring or smocking.

Figure 11:
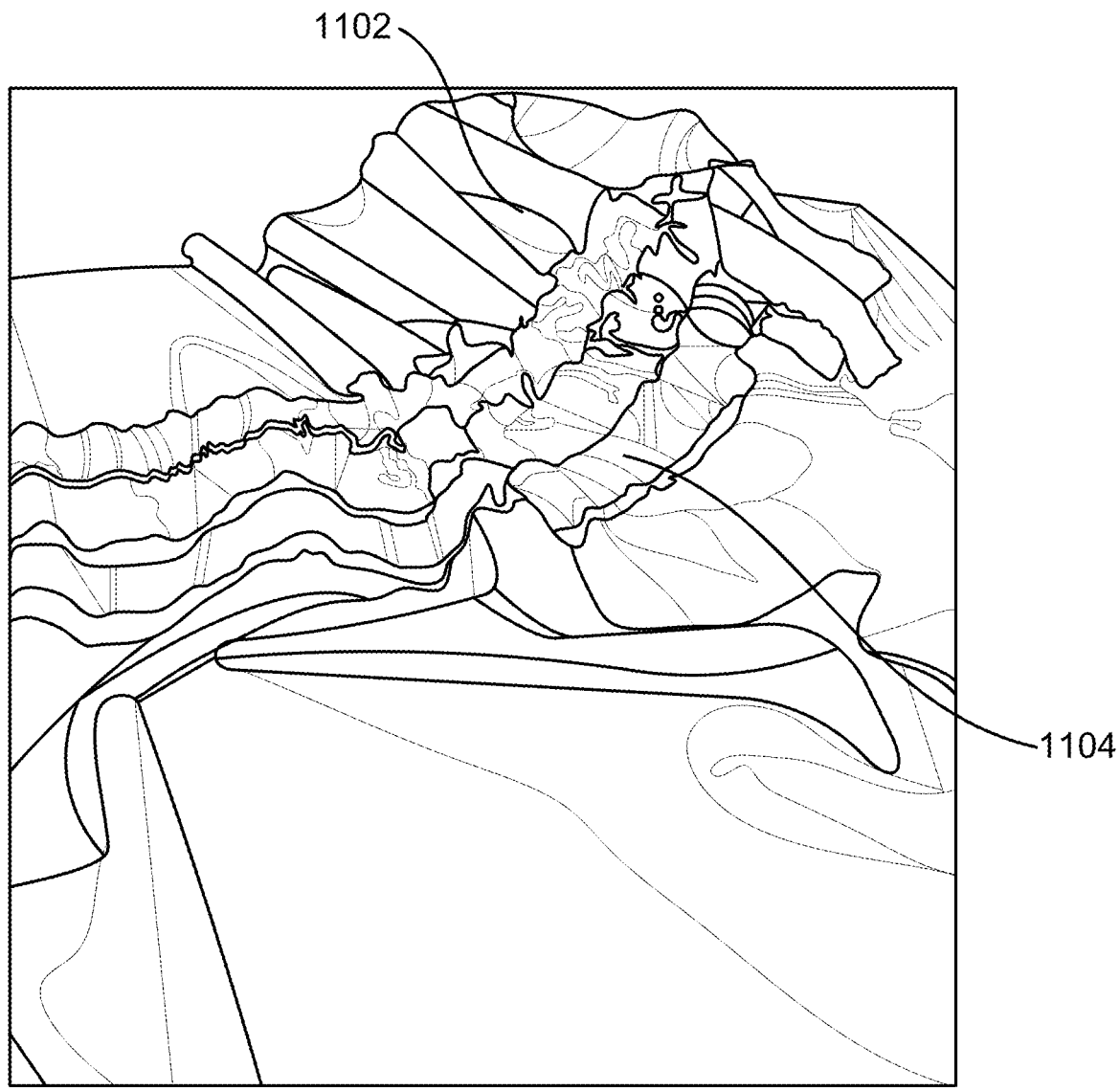
FIG. 11 shows a photograph of latex sewn to a cut strip of latex.

FIG. 11 shows sewn latex 1102 sewn to a cut latex strip 1104, wherein the elastic properties of the latex manipulate sewn latex 1102 to function essentially as a "latex draw string."

Figure 12:
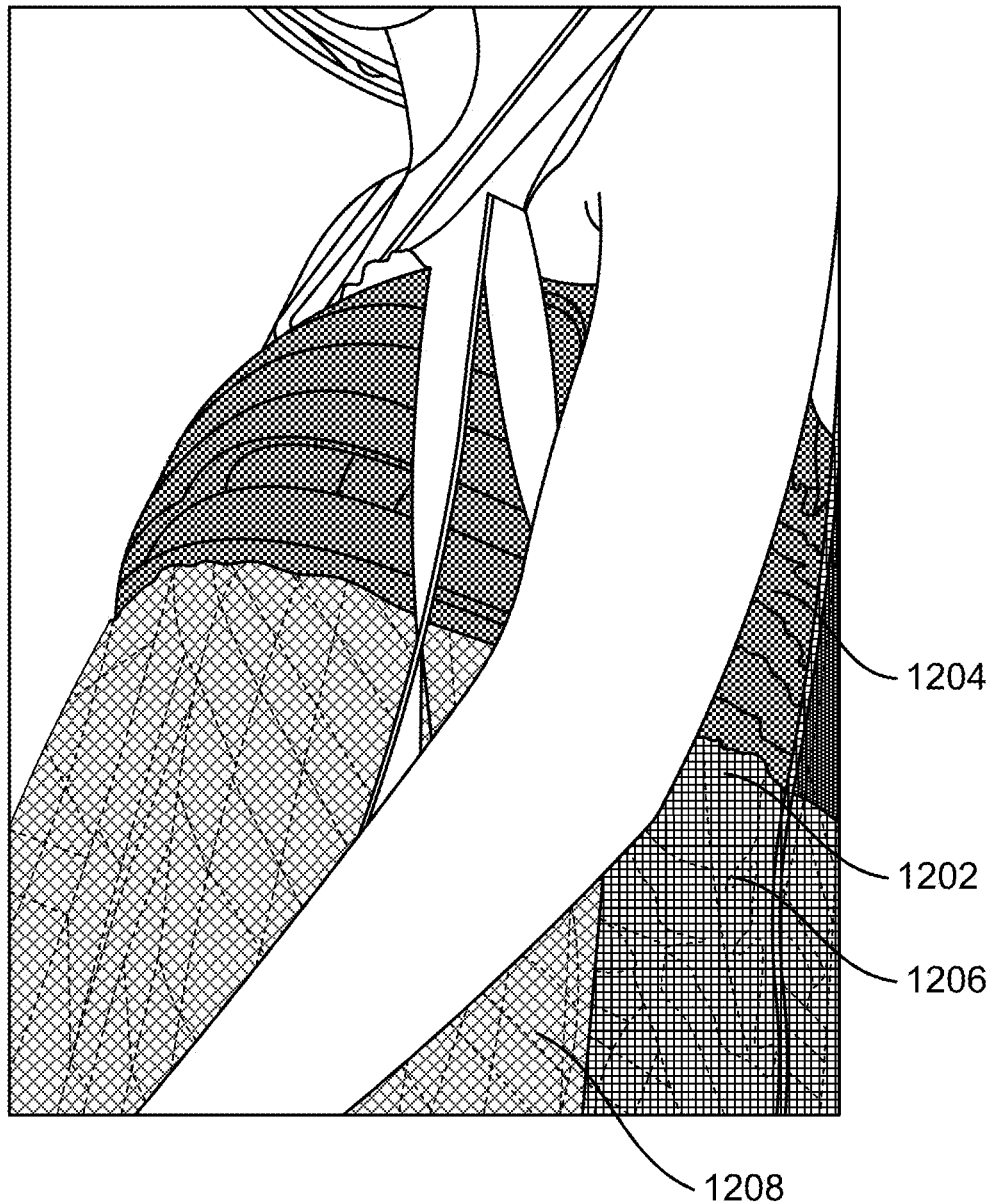
FIG. 12 shows a photograph of a garment made via the methods and techniques of the current disclosure with latex sewn over fabric, gathered sewn latex, as well as quilted latex sewn over fabric.

FIG. 12 shows garment 1202 that encompasses multiple techniques of the current disclosure to form garment 1202 with latex sewn over fabric 1204, gathered latex sewn to itself 1206, and quilted latex over fabric 1208. Again, prior to the methods and techniques disclosed herein, these manipulations of latex were considered impossible in the fashion industry and would not have been tried by those skilled in the art, who would have recommended instead that one use glue or adhesives to secure latex to fabrics or other similar materials. Here, a gathered piece of fabric has been sewn into the quilted latex fabric as well as the latex drawstring.

FIG. 13 shows two pieces of latex machine overlocked together 1302. This closes seam 1304 while using an overlock sewing machine, not shown, which is the most common commercial method for closing and finishing seams for normal fabric as employed by those of skill in the art. This technique, too, would have been taught away from by those skilled in the art. As FIG. 13 shows, the entire boundary 1306 between the pieces of latex has been secured via stitching 1308 and transverse stitching 1310, which joins first latex piece 1301 and second latex piece 1303, across body 1312 of the latex pieces, is also stable and secure.

Figure 14B:
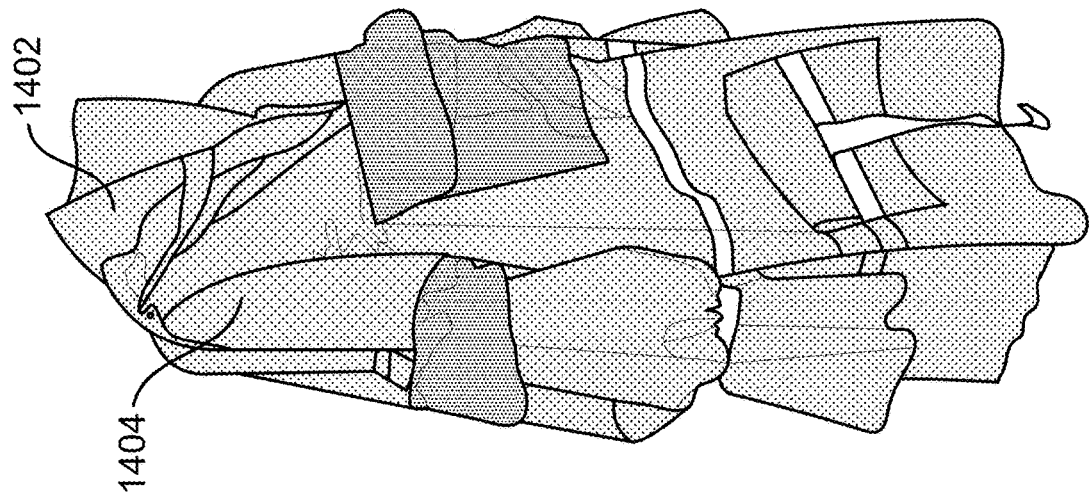
FIG. 14 shows a photograph of a complete garment made from latex using the methods and techniques of the current disclosure with no ripped or strained seams.
Figure 14A:
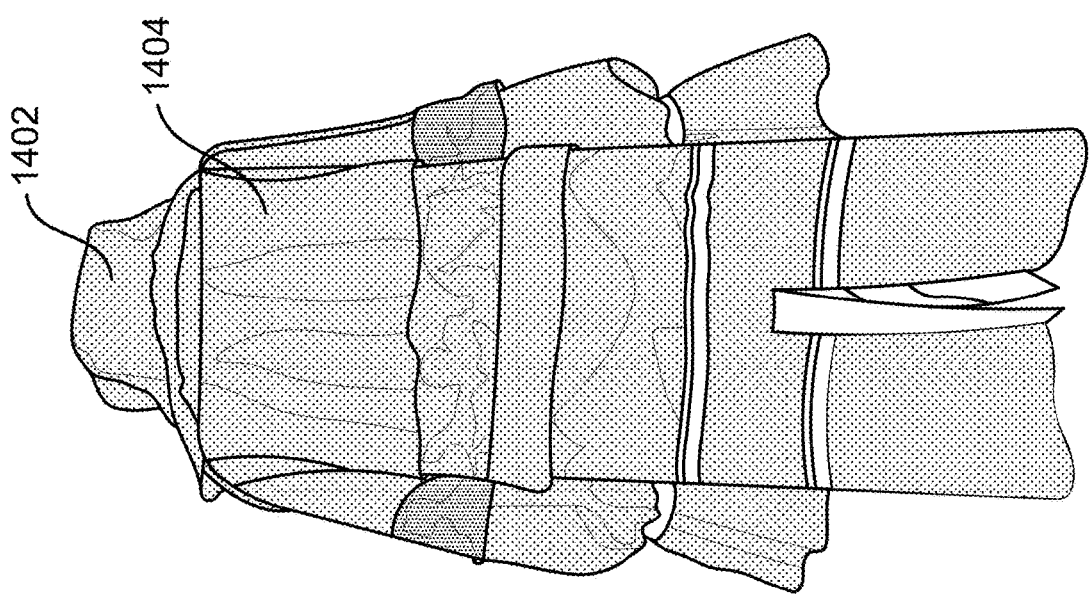

FIG. 14 shows a back view (A) and side view (B) of a garment 1402 formed from the current methods and techniques. The entirety of garment 1402 is made from stitched latex without having ripped or torn seams and/or damaging the latex 1404 forming garment 1402.

Figure 15B:
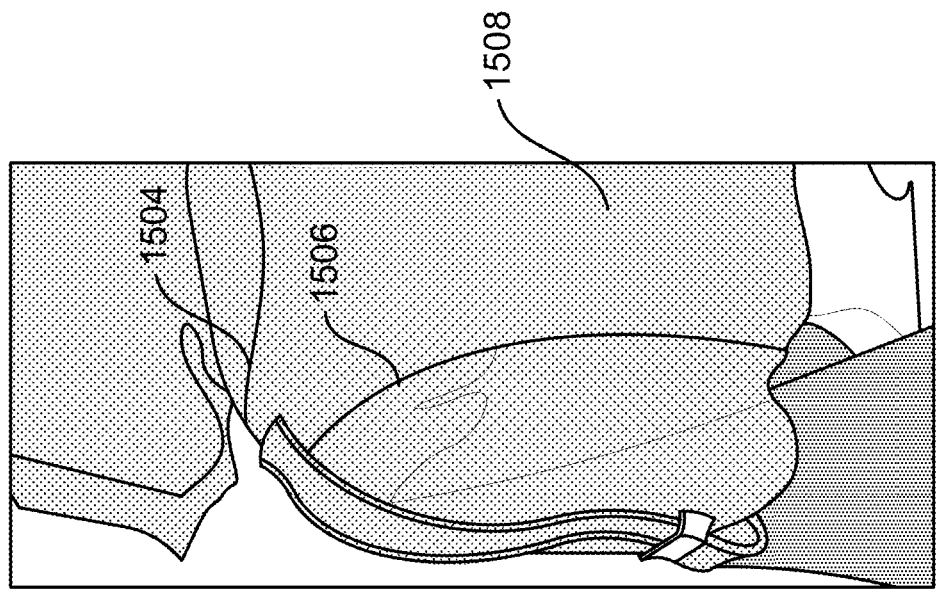
FIG. 15 shows close-up photographs of the garment of FIG. 14 demonstrating at: (A) sleeve seams; and (B) shoulder and back seams with clean and straight lines sewn into latex as disclosed herein.
Figure 15A:
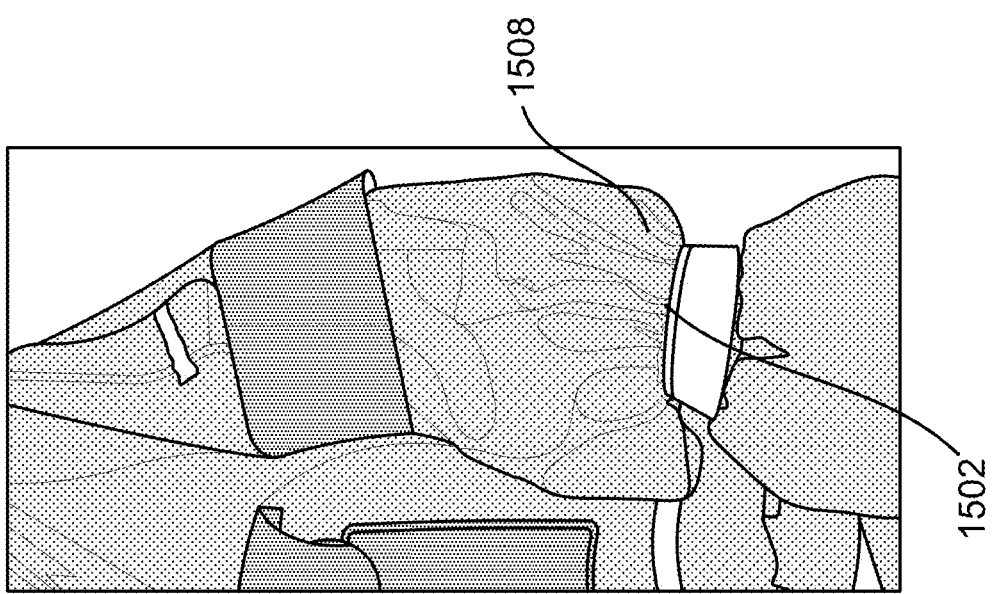

FIG. 15 shows at (A) sleeve seams 1502 and at (B) back seams 1504 and shoulder seams 1506 displaying clean and straight sewing lines with clean stitching that does not tear, mar or damage latex 1508.

FIG. 16 shows at (A) a back view of garment 1602 with quilted latex 1604 sewn into shoulder seam 1606 of garment 1602 with (B) showing a front perspective view of garment 1602. As FIG. 16 shows, no stitching is pulled or skipped and the lines 1608 formed by the technique of the current disclosure are clean and straight.

Figure 17:
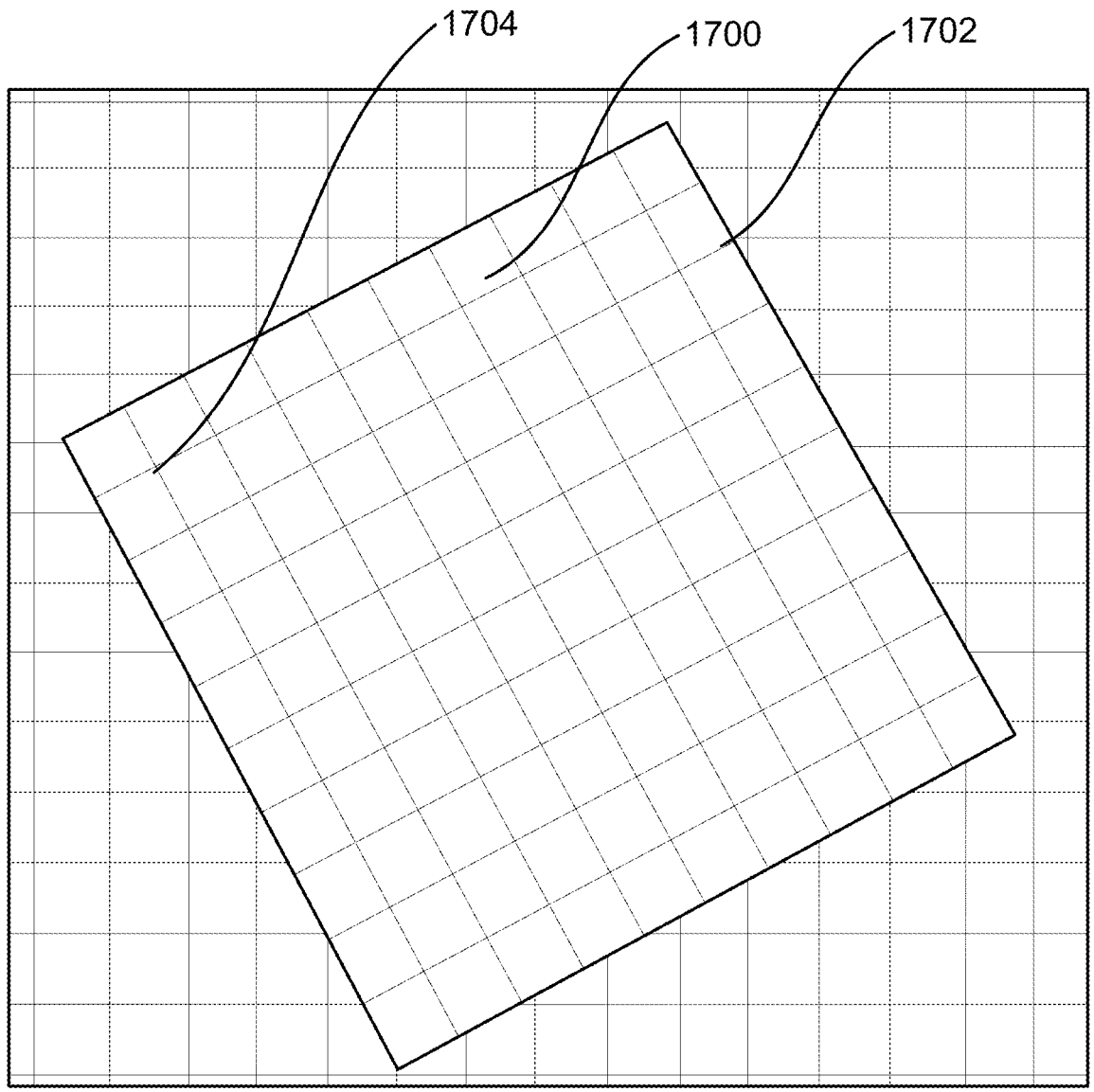
FIG. 17 shows a photograph of latex between pieces of paper.

FIG. 17 shows a photograph of construct 1700 with latex, not shown, sandwiched between pieces of paper, with top sheet 1702 shown, and secured via pin 1704.

Figure 18:
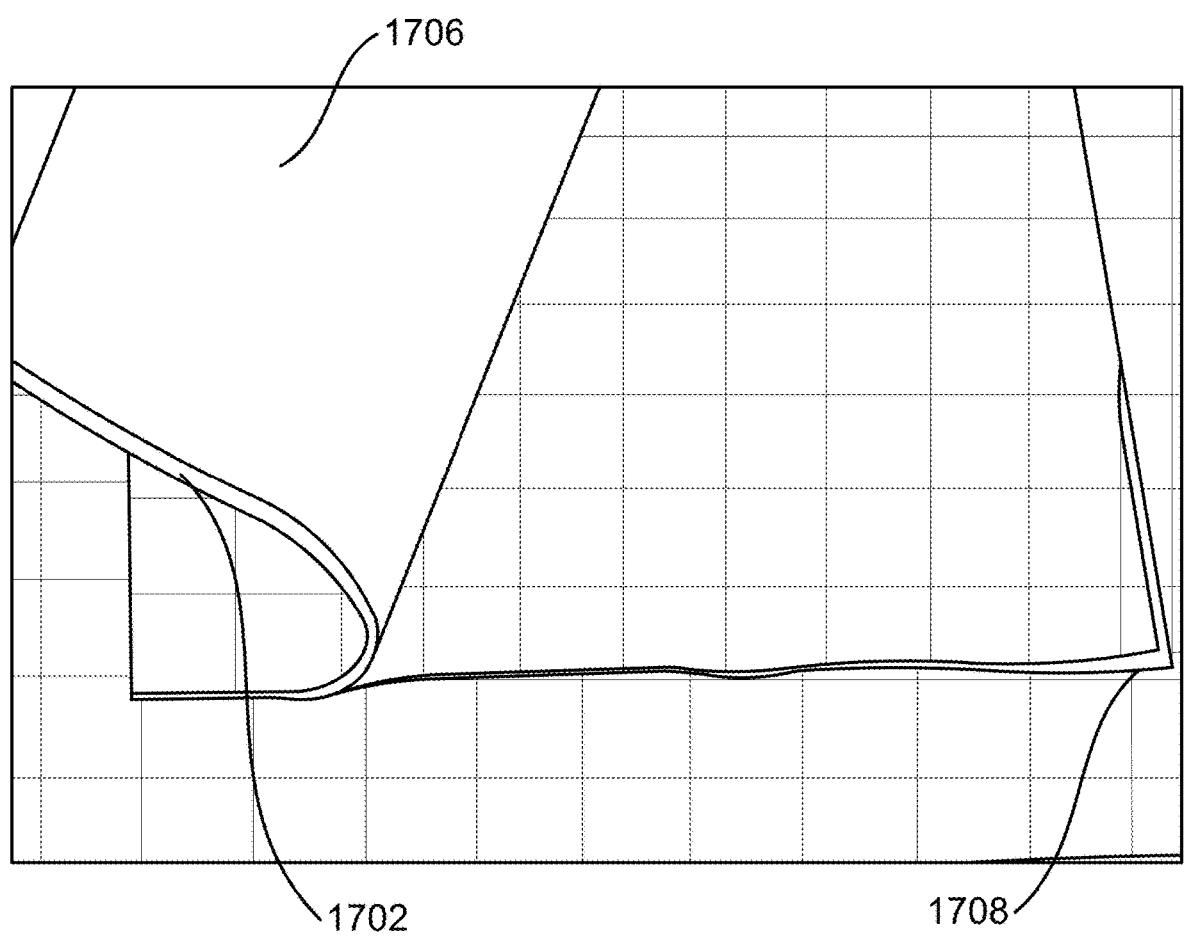
FIG. 18 shows a photograph of the construct of FIG. 17 pulled back to reveal the "sandwiched" latex.

FIG. 18 shows a photograph construct 1700 with top sheet 1702 pulled back to reveal the "sandwiched" latex 1706 and bottom sheet of paper 1708.

Figure 19:
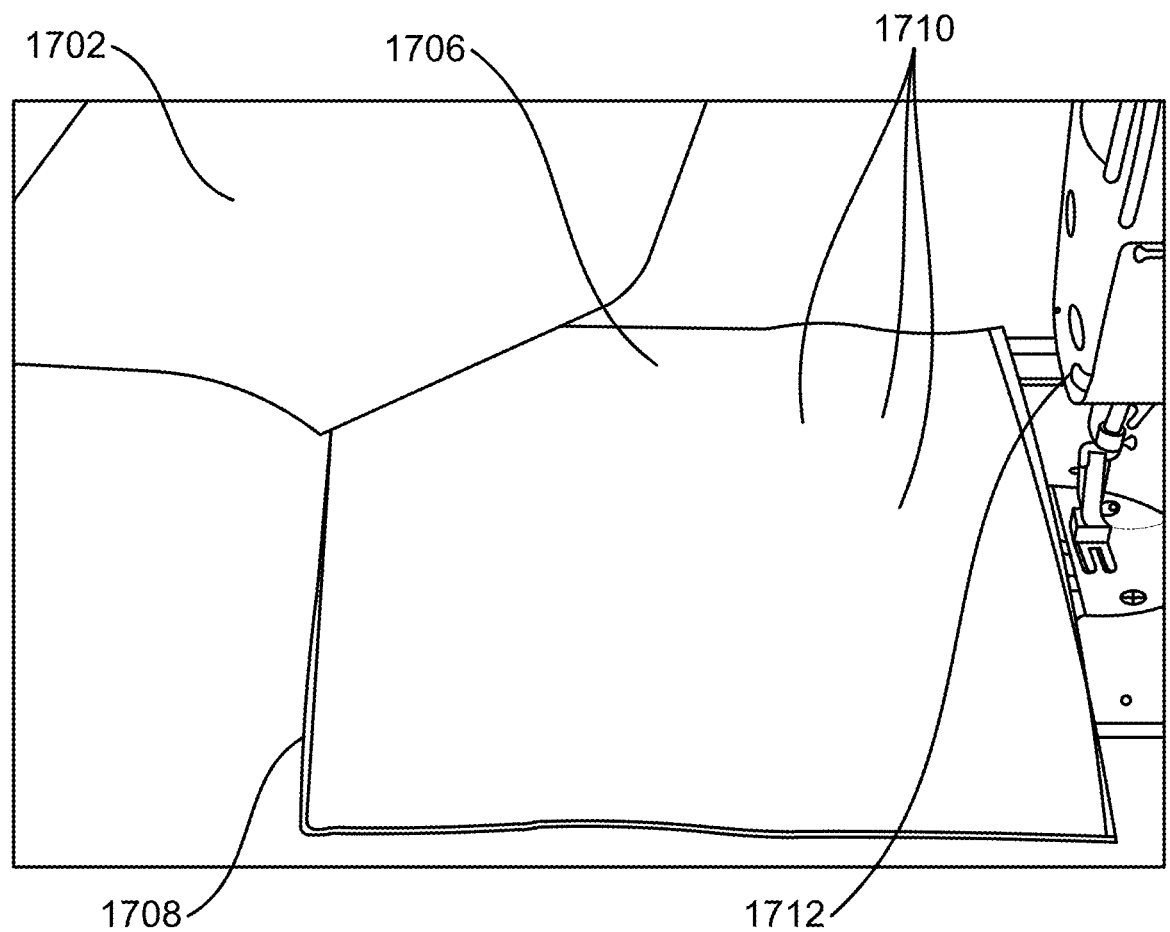
FIG. 19 shows a photograph the construct of FIG. 17 with one corner stitched together.

FIG. 19 shows construct 1700 and grid lines 1710 on bottom sheet 1708 visible through latex 1706 to guide in sewing with sewing machine 1712.

Figure 20:
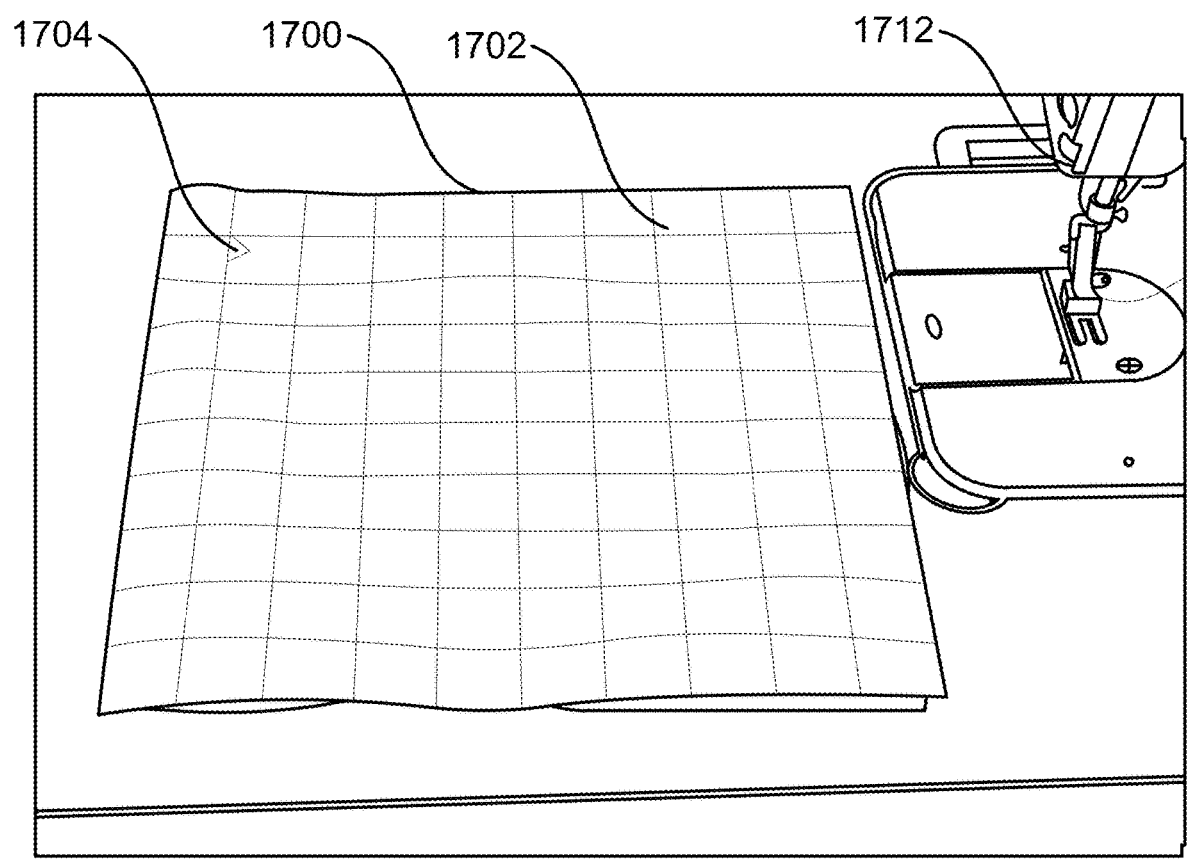
FIG. 20 shows a photograph of the construct of FIG. 17 ready for sewing.

FIG. 20 shows construct 1700 ready for sewing.

Figure 21:
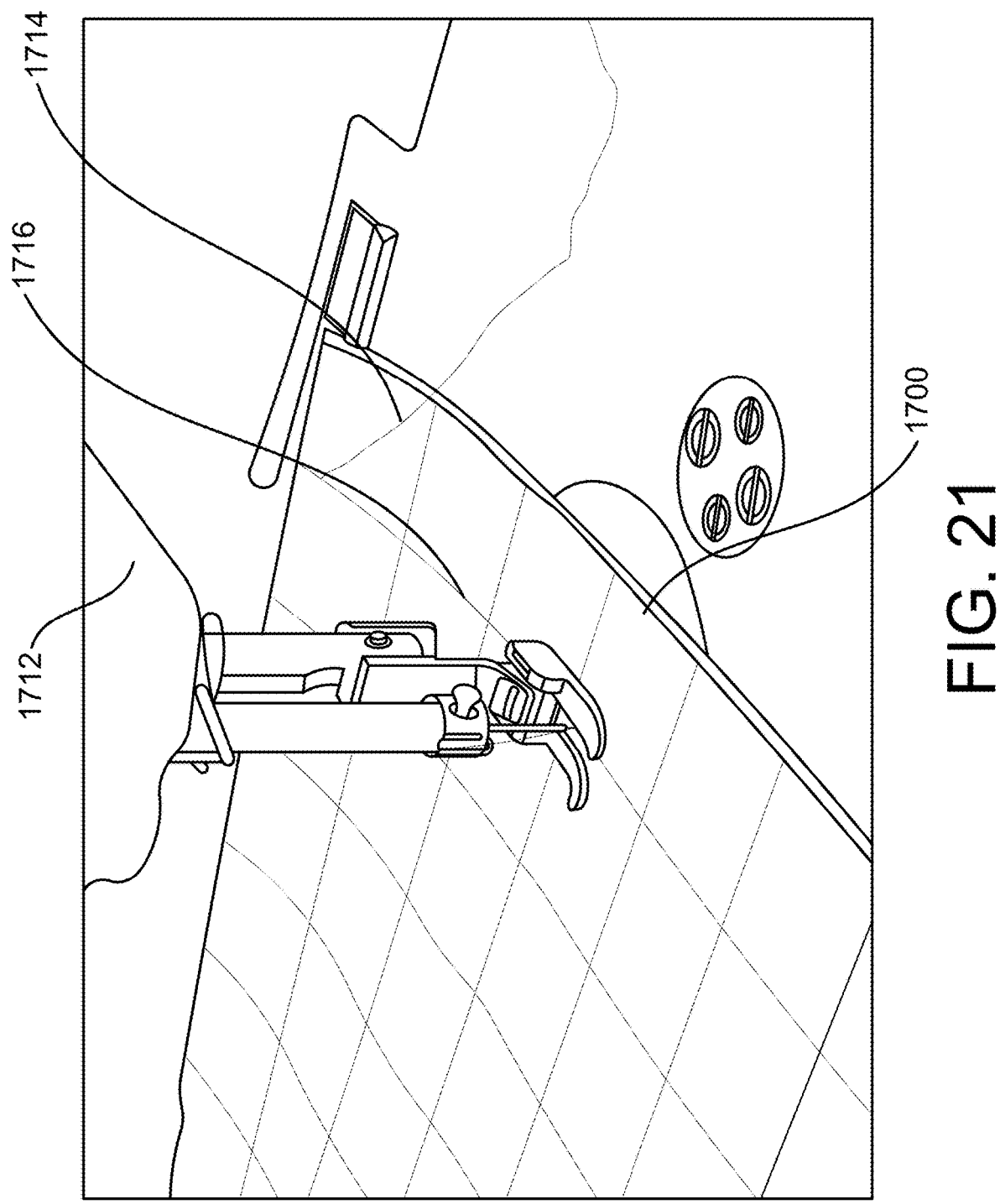
FIG. 21 shows a photograph of the construct of FIG. 17 being sewn.

FIG. 21 shows construct 1700 being sewn with thread 1714 to create stitching line/seams 1716. As FIG. 21 shows, no pulling of paper 1702, 1708 nor latex 1706 occurs as construct 1700 is sewn.

Figure 22:
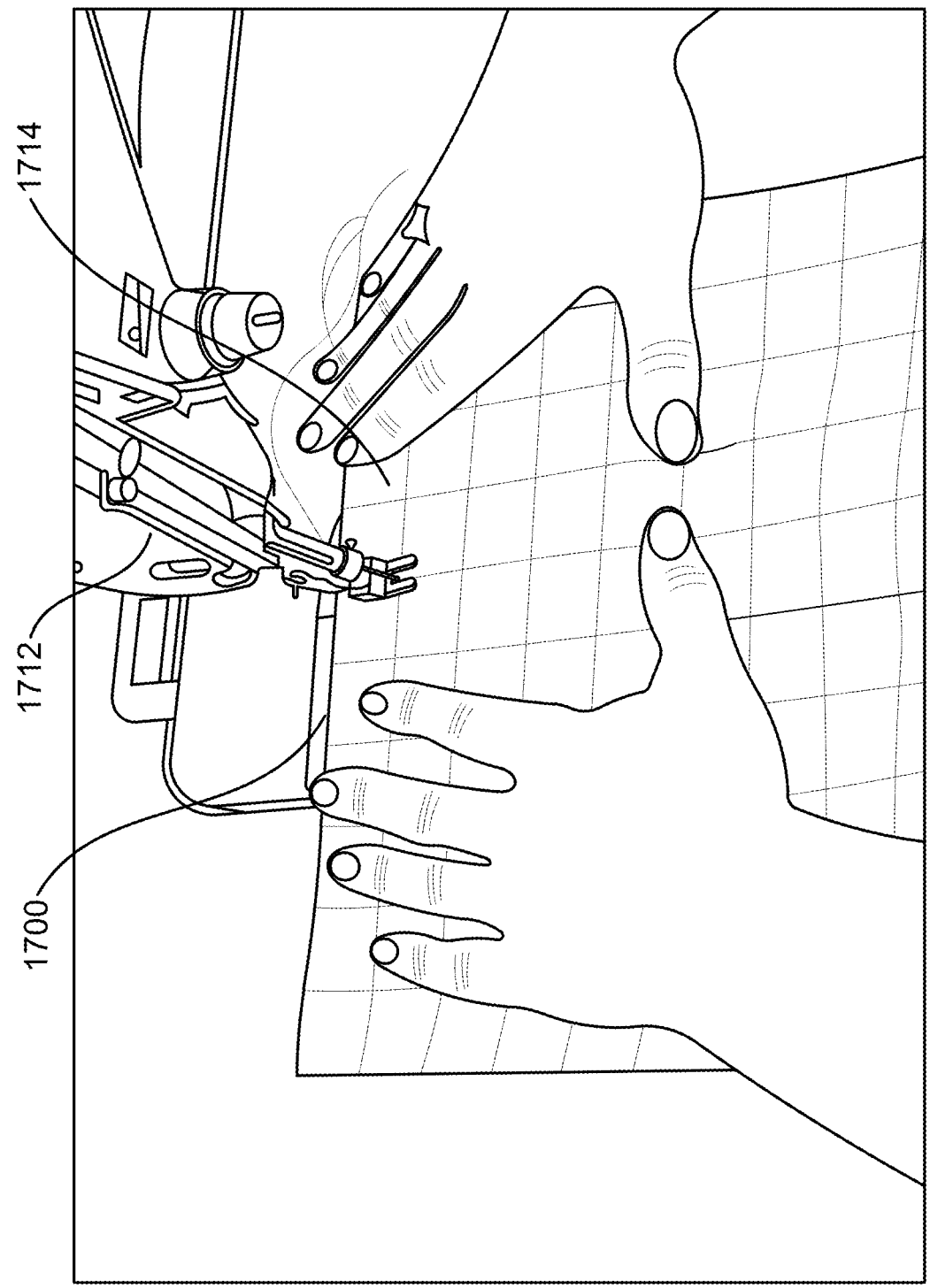
FIG. 22 shows a photograph of the construct of FIG. 17 being guided through a sewing machine.

FIG. 22 shows a user may employ both hands to guide construct 1700 through sewing machine 1712 to smooth out paper 1702, 1708 and latex 1706 and to create sound stitching lines.

Figure 23:
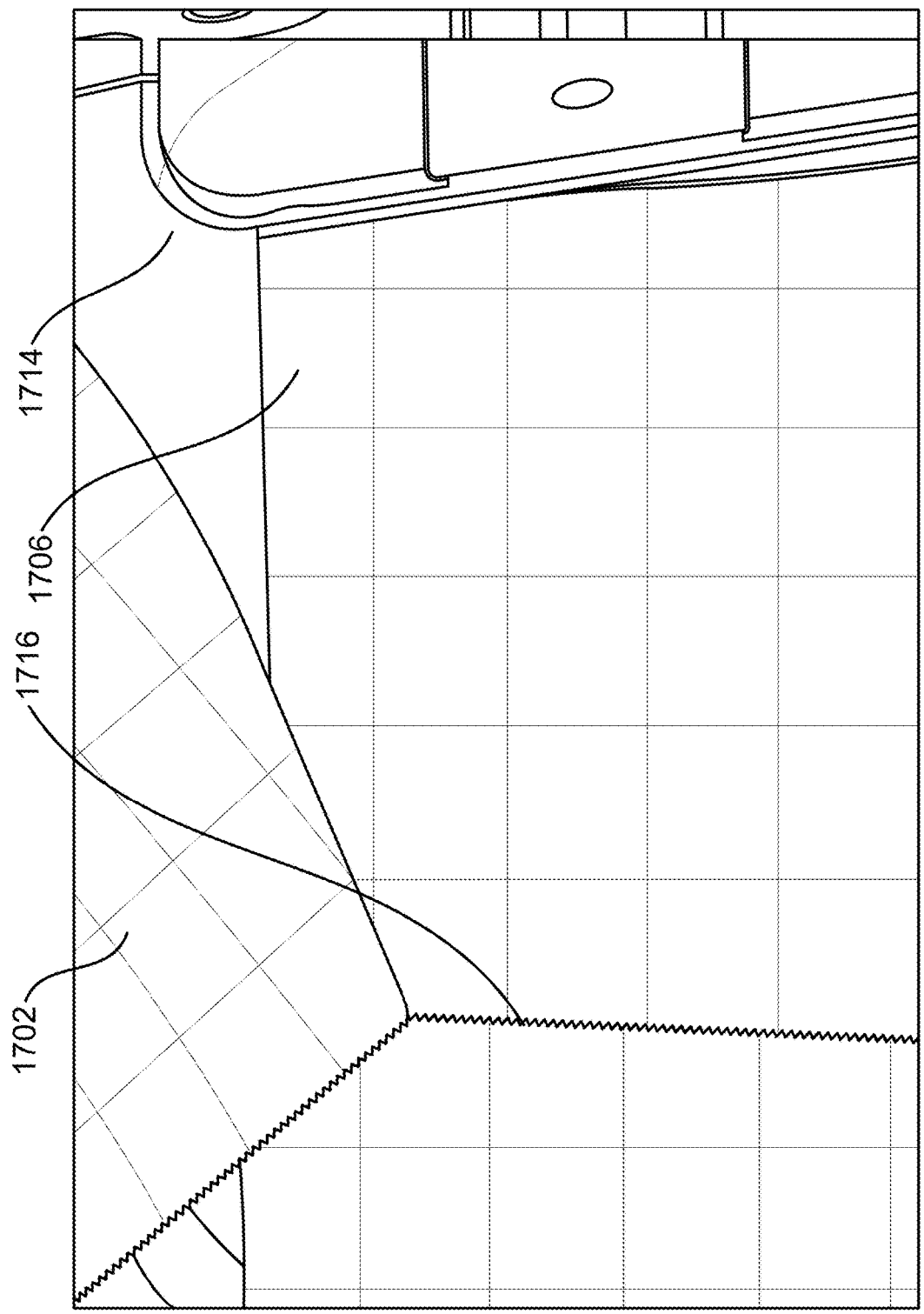
FIG. 23 shows a photograph of the construct of FIG. 17 with paper being removed from the sewn latex.

FIG. 23 shows construct 1700 with top sheet 1702 being torn from stitching line/seam 1716. AS FIG. 23 shows stitching line/seam 1716 is secure and remains in latex 1706 without disturbance as top sheet 1702 is removed, showing the novelty of the current disclosure in view of previously accepted practice.

Figure 24:
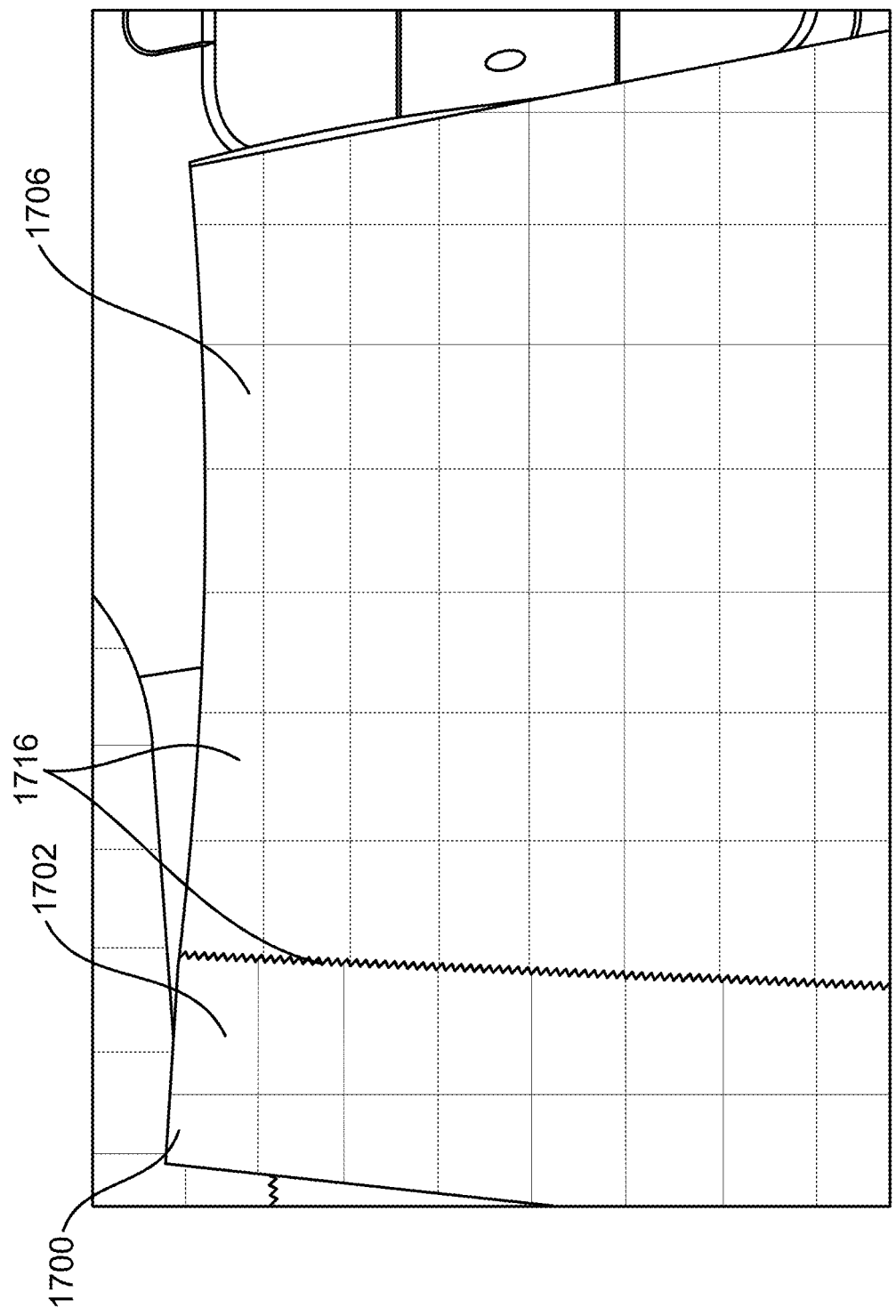
FIG. 24 shows a photograph of the construct of FIG. 17 with a stitch line made in the latex.

FIG. 24 shows construct 1700 with a portion of top sheet 1702 removed from construct 1700. Leaving stitching lines/seams 1716 in place in latex 1706.

Figure 25:
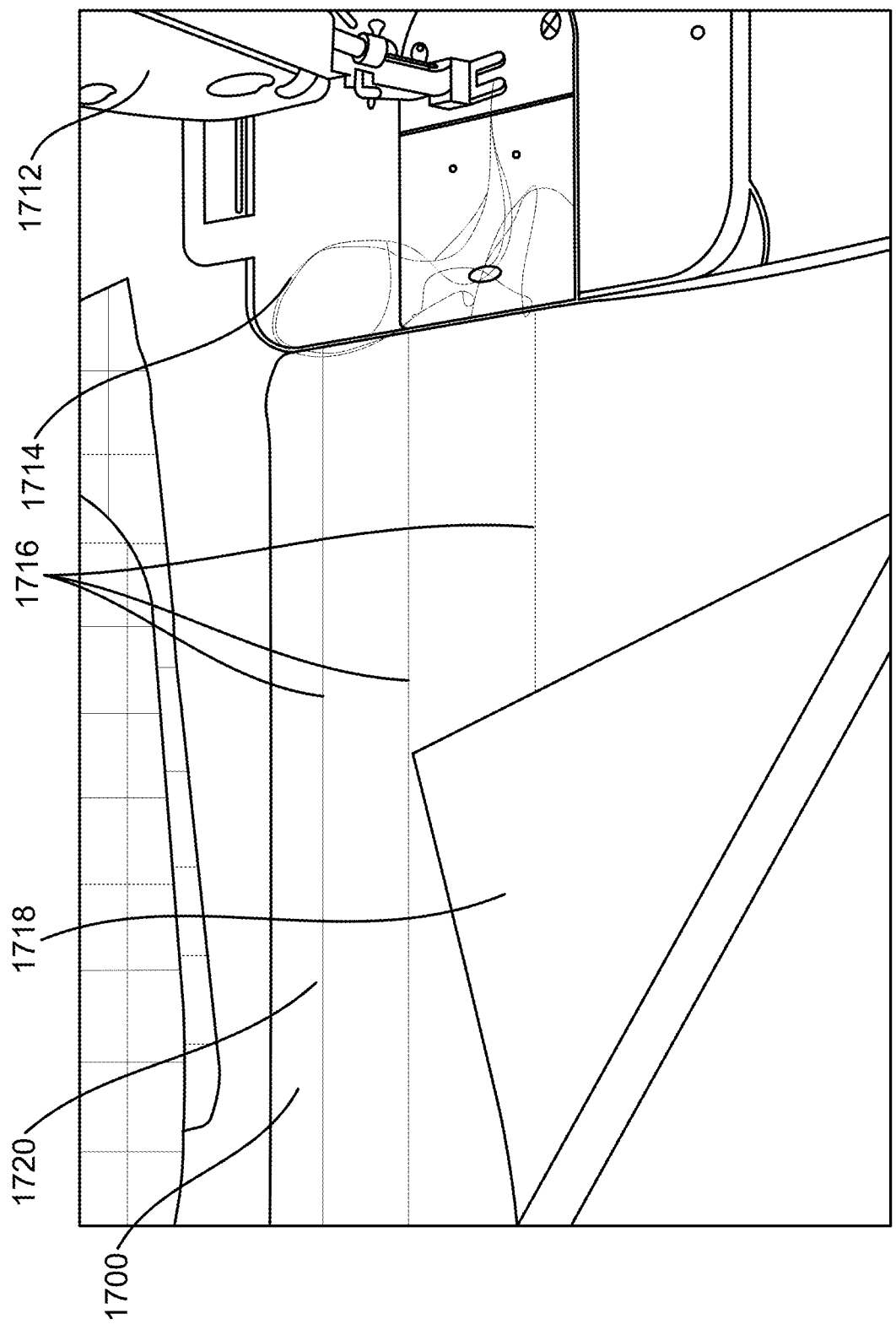
FIG. 25 shows a photograph of the construct of FIG. 17 with multiple stitches in place.

FIG. 25 shows construct 1700 with top sheet 1702 completely removed while leaving stitching lines/seams 1716 in place with no pulling, tearing or other deformations created in latex 1706. "Bottom side" of latex sheet 1718 is shown via folding latex sheet 1706 onto itself. The next step is to remove bottom sheet of paper 1708. "Bottom" is relative in this context and signifies the side opposite sewing surface of latex 1720.

Figure 26A:
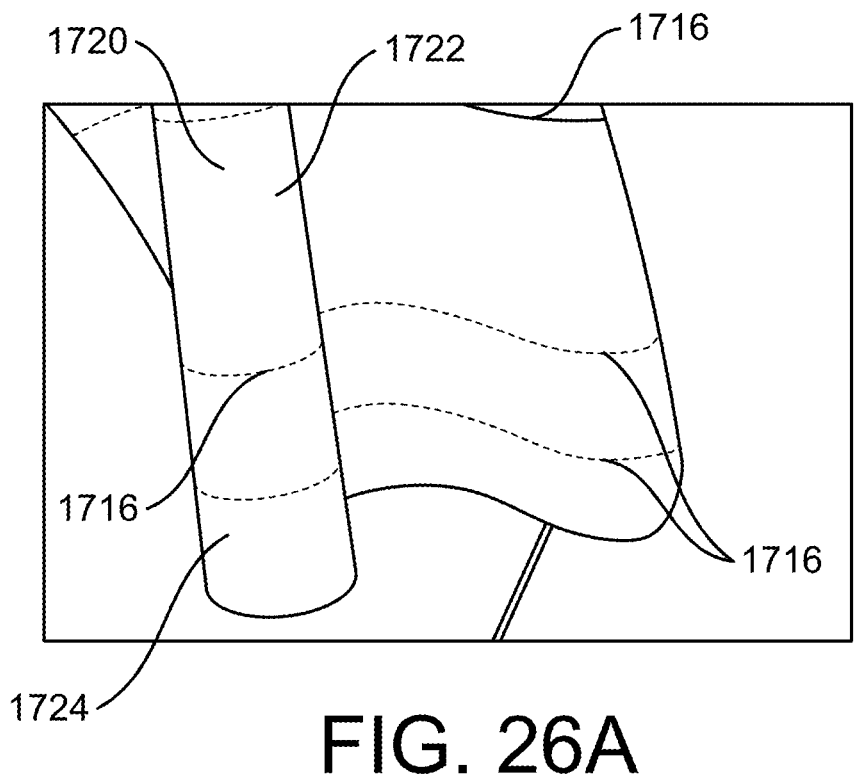
FIGS. 26A and 26B show photographs of the construct of FIG. 17 with paper full removed and even stitches exhibiting drape.
Figure 26B:
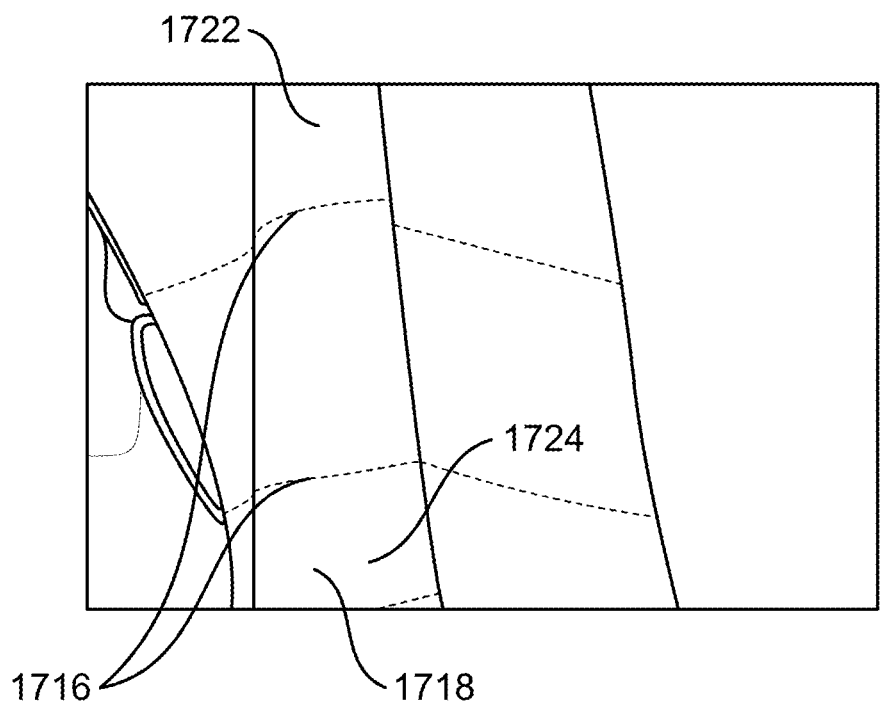

FIGS. 26A and 26B show top sheet of paper 1702 and bottom sheet of paper 1708 removed from construct 1700 leaving clean stitching lines/seams 1716 in bottom side of latex sheet 1718 and sewing surface side of latex sheet 1720. As FIGS. 26A and 26B show, the sewn latex 1722 exhibits drape 1724 and even, clean stitching.

Figure 27:
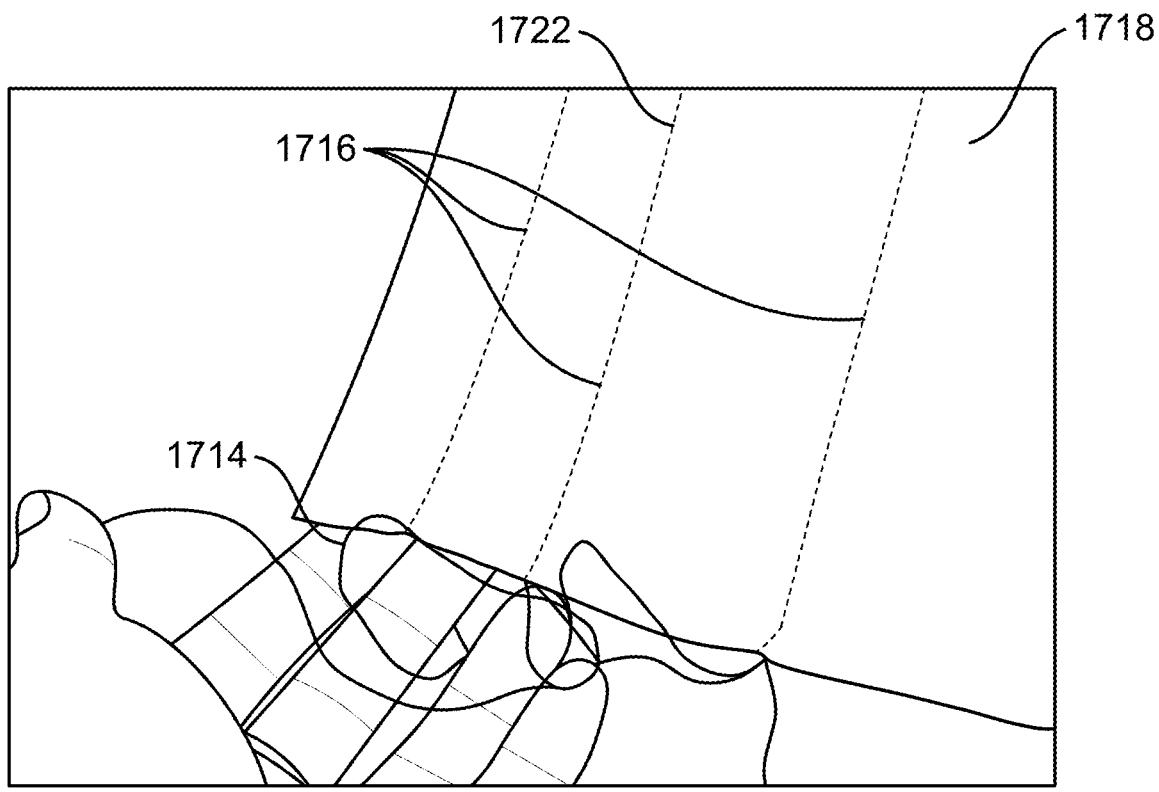
FIG. 27 shows a photograph of the construct of FIG. 17 showing the reverse side of the construct and the visible stitching lines and thread.

FIG. 27 shows sewn latex 1722 bottom side of latex 1718 and the clean, strong stitching lines/seams 1716 created in latex 1706 via the methods and techniques of the current disclosure previously taught to be impossible in sewing/stitching industries.

Figure 28:
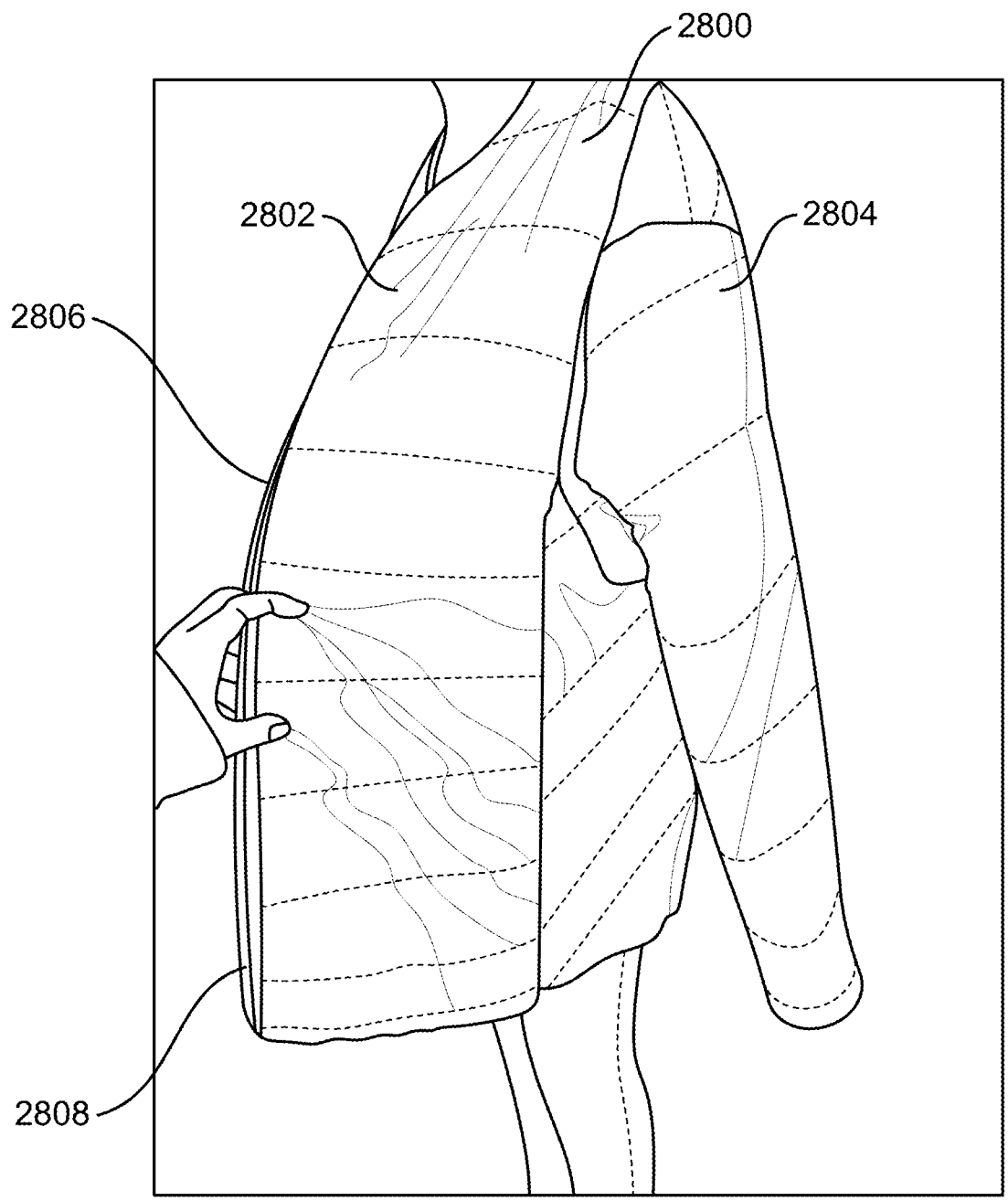
FIG. 28 shows a puffer jacket made from the techniques of the current disclosure.

FIG. 28 shows a picture of a puffer jacket 2800 made via the techniques of the current disclosure. As shown, latex 2802 forms outer shell 2804 of puffer jacket 2800 and has the look and aesthetics of fabric or cloth. In one embodiment, puffer jacket 2800 may comprise 0.25 mm latex sewn to cotton muslin 2806 and cotton batting 2808

For purposes of example only and not intended to limit the present disclosure to this example, one inserts a needle sized 110/18 or 90/14 into the needle holder into a sewing machine. Once the needle is secured in the machine, one will need colors, such as two or more colors, of heavy-duty thread, which may be Coats & Clark Dual Duty XP Heavy Thread. Regular thread will pop and the stitches will rip. Wind the bobbin with a different color of this same thread, this will help identify problems that may occur while stitching. Secondly, thread the sewing machine with a different color. Next, choose the pressure foot for sewing. A Teflon Presser Foot is nonstick unlike common metal feet and can aid in sewing because it creates less friction. A roller Foot can be used for single layer stitching in fabric manipulations and sometimes thicker additions. One preferred Foot is a Heavy-Duty Large Foot or Standard Plain Sewing Machine Foot with most projects. Unfortunately, every machine is different and a "broad brush" tension setting is not possible as most machine pressure feet are not labelled. It is somewhat trial and error decreasing and increasing pressure foot tension. Because of this, the current disclosure uses a test fabric square 10×10 inches in size with a cotton/muslin fabric to check that the sewing machine is sewing straight stitches. Take leather scissors and cut four 10×10 in. squares of gridded or alphanumerical marked semi-transparent paper, two 10×10 in. squares of Radical Rubber latex 0.25 or 0.40 mm, and two 10×10 in cotton muslin squares. These will be test samples. Please take one cut out square of muslin fabric and fold it in half. This creates a double layer and better represents the way the fabric will act when sewing a garment. One should sew a few test lines on this cotton-muslin square and examine to see how they appear and how flat they are. Stitches should be slightly embedded in the fabric, sit flat, look the same from the top and bottom of the fabric, and the fabric sits flat and has no puckers. Ensure stitches are none of the following; stitch loops lift above surface level of fabric, the stitches only look good on one side of the fabric, and or the thread creating loops on the other side of the fabric, stitches are uneven or the machine is skipping stitches, fabric is puckering or marked from the feed dog teeth. If the fabric is puckering/the feed dogs are marking fabric please release pressure of foot by turning the knob anticlockwise to the left. On the other hand, if the sewing machine is creating uneven stitches or skipping stitches the foot pressure needs to be increased by turning the knob clockwise towards the right.

After one has sewn test lines and acquired desired tension on the fabric, please use two pieces of paper cut to size, and one square of the same size cut latex. Please put one piece of paper flat on the table and lay out the latex evenly over it so that there are no puckers and it is completely flat. Then take the second piece of cut paper and place it evenly on top of the other two pieces so that their matches exactly line up. Take 1-5 dressmaking pins and pin all four corners of the squares and in the middle of the square. Add more if desired. Now, one is ready to sew latex.

Place the paper-sandwiched-latex on the sewing machine and begin sewing some lines and examine the stitches as discussed in the discourse above. This method makes the material move easily through the sewing machine so it should not be difficult to alter the tension accordingly. Once one has sewn some lines and have adjusted according to what works best with the machine, back stitch and anchor the stitch so it does not pull out the stitch ends when removing the paper from the stitches. Next, remove the piece from the sewing machine, cutting the top and bottom threads. Begin removing the paper from the stitched-over lines of the 10×10 inch square. Following the lines on the paper is not required, it is just a helpful reference. Remove any remaining pins. The pins will not puncture the latex long term and will not be noticeable. This is medical grade latex and a slight puncture will not cause the material to rip, which is often seen in latex with fillers commonly seen on the market in the fashion industry. The stitches should be sturdy and not bothered by any removing of paper if stitched properly and following suggestions above. Everyone prefers a different stitch length for their garments depending on the material, however, one preferred selection is 2.5-3.0 mm stitch length for 8-10 stitches per inch on garment. When sewing with thicker fabric underneath latex instead of paper, one will need to adjust the foot pressure again by just loosening it and relieving some pressure off of the fabric leaving more room for it. The same goes for the stitch tension.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A method for sewing latex fabric comprising:
    placing a first piece of latex sheeting between a first translucent substrate and a second translucent substrate to form a multi-layer translucent protective support with the first piece of latex sheeting substantially entirely covered on a top surface and substantially entirely covered on a bottom surface of the first piece of latex sheeting by the first translucent substrate and the second translucent substrate;
    placing a second piece of latex sheeting adjacent the first piece of latex sheeting, both between the first translucent substrate and the second translucent substrate, stitching through the first translucent substrate, the second translucent substrate, the first piece of latex sheeting and the second piece of latex sheeting, via a sewing machine, to form at least one stitch between the first piece of latex sheeting and the second piece of latex sheeting;
    removing the first translucent substrate and the second translucent substrate to reveal the at least one stitch;
    wherein no adhesive is used and the multi-layer translucent protective support forms at least one barrier between the first piece and second piece of latex sheeting and a user.

2. The method of claim 1, further comprising placing at least one piece of fabric adjacent the first piece of latex sheeting and between the first and second translucent substrates and then the at least one piece of fabric and the first piece of latex sheeting stitched together between the first and second translucent substrate to form at least one stitch between the at least one piece of fabric and the first piece of latex sheeting.

3. The method of claim 1, further comprising placing at least three pieces of latex sheeting adjacent one another, all between the first translucent substrate and the second translucent substrate, and the at least three pieces of latex sheeting stitched together between the first translucent substrate and the second translucent substrate.

4. The method of claim 1, further comprising placing at least two pieces of fabric and at least two pieces of latex sheeting adjacent one another, all between the first translucent substrate and the second translucent substrate, and stitching the at least two pieces of fabric and the at least two pieces of latex sheeting together between the first translucent substrate and the second translucent substrate.

5. The method of claim 1, wherein the first translucent substrate and the second translucent substrate comprise low GSM paper ranging from 10-35 GSM.

6. The method of claim 1, wherein thread is used to form the at least one stitch in the first translucent substrate, the second translucent substrate, the first piece of latex sheeting and the second piece of latex sheeting.

7. The method of claim 1, further comprising forming patchwork, piping, pleating, shirring, stitch-and-slash, gathering, smocking, quilting, machine embroidery, hand embroidery, top-stitching, decorative stitching, pleating and/or applique in the first piece of latex sheeting.

8. The method of claim 2, further comprising forming patchwork, piping, pleating, shirring, stitch-and-slash, gathering, smocking, quilting, machine embroidery, hand embroidery, top-stitching, decorative stitching, pleating and/or applique in the at least one piece of fabric and the first piece of latex sheeting.

9. A method of forming a garment comprising stitched latex formed by:
- forming a clothing pattern, comprising a first pattern block of latex sheeting;
- placing the first pattern block of latex sheeting between a first translucent substrate and a second translucent substrate to form a multi-layer translucent protective support with the first pattern block of latex sheeting substantially entirely covered on a top surface and a bottom surface of the first pattern block of latex sheeting by the first translucent substrate and the second translucent substrate;
- placing the first pattern block of latex sheeting adjacent a second pattern block of latex sheeting, with the first pattern block of latex sheeting and the second pattern block of latex sheeting both between the first translucent substrate and the second translucent substrate;
- stitching through the first translucent substrate, the second translucent substrate, the first pattern block of latex sheeting and the second pattern block of latex sheeting, via a sewing machine, to produce at least one stitch joining the first pattern block of latex sheeting to the second pattern block of latex sheeting;
- removing the first translucent substrate and second translucent substrate to reveal the at least one stitch;
- wherein no adhesive is used and the multi-layer translucent protective support forms at least one barrier between the first pattern block of latex sheeting and the second pattern block of latex sheeting and a user.

10. The method of claim 9, further comprising:
- placing the first pattern block of latex sheeting adjacent a first pattern block of fabric, with the first pattern block of latex sheeting and the first pattern block of fabric between the first translucent substrate and the second translucent substrate; and
- stitching the first pattern block of latex sheeting to the first pattern block of fabric between the first translucent substrate and the second translucent substrate to produce at least one stitch joining the first pattern block of latex sheeting to the first pattern block of fabric.

11. The method of claim 9, further comprising:
- placing at least two pattern blocks of latex sheeting adjacent at least two pattern blocks comprising fabric, with the at least two pattern blocks of latex sheeting and the at least two pattern blocks comprising fabric between the first and second translucent substrate; and
- stitching the at least two pattern blocks of latex sheeting and the at least two pattern blocks comprising fabric between the first translucent substrate and the second translucent substrate.

12. The method of claim 9, wherein the first translucent substrate and the second translucent substrate comprise low GSM paper ranging from 10-35 GSM.

13. The method of claim 9, wherein thread is used to form the at least one stitch in the first translucent substrate, second translucent substrate and first pattern block of latex sheeting and the second pattern block of latex sheeting.

14. The method of claim 9, wherein the garment includes patchwork, piping, pleating, shirring, stitch-and-slash, gathering, smocking, quilting, machine embroidery, hand embroidery, top-stitching, pleating and/or applique in the first pattern block of latex sheeting.

15. The method of claim 10, further comprising forming patchwork, piping, pleating, shirring, stitch-and-slash, gathering, smocking, quilting, machine embroidery, hand embroidery, top-stitching, pleating and/or applique in the first pattern block of latex sheeting or the first pattern block of fabric.

* * * * *